United States Patent
Zhang et al.

(10) Patent No.: US 11,948,233 B2
(45) Date of Patent: Apr. 2, 2024

(54) IMAGE DISPLAY METHOD AND ELECTRONIC DEVICE

(71) Applicant: HUAWEI TECHNOLOGIES CO., LTD., Shenzhen (CN)

(72) Inventors: Jingchao Zhang, Beijing (CN); Yan Yan, Beijing (CN); Lian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 182 days.

(21) Appl. No.: 17/727,148

(22) Filed: Apr. 22, 2022

(65) Prior Publication Data

US 2022/0245878 A1 Aug. 4, 2022

Related U.S. Application Data

(63) Continuation of application No. PCT/CN2020/110337, filed on Aug. 20, 2020.

(30) Foreign Application Priority Data

Oct. 24, 2019 (CN) .......................... 201911016209.6
Nov. 7, 2019 (CN) .......................... 201911082843.X

(51) Int. Cl.
*G06T 11/60* (2006.01)
*G06F 3/04886* (2022.01)
(Continued)

(52) U.S. Cl.
CPC .......... *G06T 11/60* (2013.01); *G06F 3/04886* (2013.01); *G06F 9/451* (2018.02);
(Continued)

(58) Field of Classification Search
CPC . G06T 11/60; G06T 2200/24; G06F 3/04886; G06F 9/451; G06F 21/57; G06F 2221/034
(Continued)

(56) References Cited

U.S. PATENT DOCUMENTS 10,102,648 B1 * 10/2018 Vannier .................. H04N 21/24
2012/0299831 A1 * 11/2012 Lioy ....................... G06F 21/36
345/168
(Continued)

FOREIGN PATENT DOCUMENTS

CN 104115413 A 10/2014
CN 104809413 A 7/2015
(Continued)

OTHER PUBLICATIONS

GlobalPlatform Device Technology, Trusted User Interface API Version 1.0, Public Release , Jun. 2013 , Document Reference: GPD_SPE_020, 48 Pages.
(Continued)

*Primary Examiner* — Jacinta M Crawford
(74) *Attorney, Agent, or Firm* — HAUPTMAN HAM, LLP

(57) ABSTRACT

An image display method includes drawing a first graph in a trusted execution environment (TEE). The method also includes displaying the first graph on a first layer in a display screen. The method further includes drawing a second graph in a rich execution environment (REE). The method additionally includes displaying the second graph on a second layer in the display screen. The first layer is located above the second layer. The first graph includes a transparent area and a non-transparent area. The non-transparent area includes content drawn in the TEE. A display area that is on the second graph and that corresponds to the transparent area
(Continued)

includes content drawn in the REE. When the first layer and the second layer are overlapped for displaying, the transparent area does not shield the content drawn in the REE.

20 Claims, 11 Drawing Sheets

(51) Int. Cl.
  *G06F 9/451* (2018.01)
  *G06F 21/57* (2013.01)
(52) U.S. Cl.
  CPC ........ *G06F 21/57* (2013.01); *G06F 2221/034* (2013.01); *G06T 2200/24* (2013.01)
(58) Field of Classification Search
  USPC .......................................................... 345/634
  See application file for complete search history.

(56) References Cited

U.S. PATENT DOCUMENTS

| | | |
|---|---|---|
| 2013/0301830 A1 | 11/2013 | Bar-El et al. |
| 2016/0364723 A1 | 12/2016 | Reese et al. |
| 2019/0266345 A1 | 8/2019 | Jeong et al. |

FOREIGN PATENT DOCUMENTS

| | | |
|---|---|---|
| CN | 104820573 A | 8/2015 |
| CN | 105528554 A | 4/2016 |
| CN | 105683981 A | 6/2016 |
| CN | 106325802 A | 1/2017 |
| CN | 106845285 A | 6/2017 |
| CN | 107315970 A | 11/2017 |
| CN | 107924449 A | 4/2018 |
| CN | 108781211 A | 11/2018 |
| CN | 109766152 A | 5/2019 |
| EP | 2648129 A1 | 10/2013 |
| WO | 2017092553 A1 | 6/2017 |
| WO | 2017147786 A1 | 9/2017 |
| WO | 2019168315 A1 | 9/2019 |

OTHER PUBLICATIONS

Chinese Office Action issued in corresponding Chinese Application No. 201911082843.X, dated Dec. 24, 2021, pp. 1-17.

International Search Report issued in corresponding International Application No. PCT/CN2020/110337, dated Nov. 25, 2020, pp. 1-9.

* cited by examiner

Display template 1

Display template 2

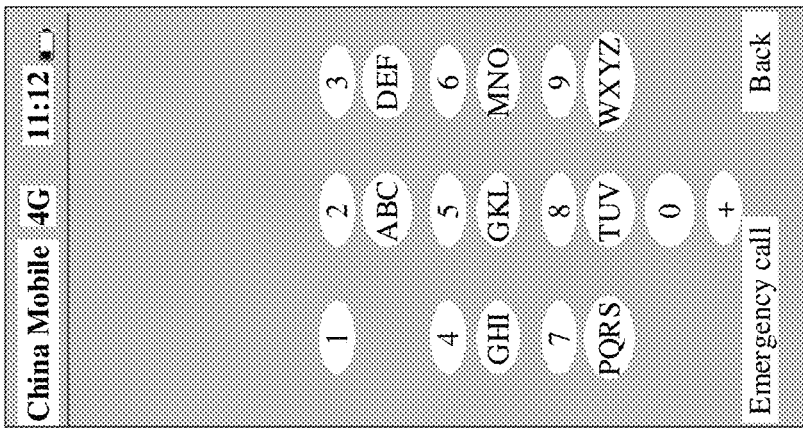
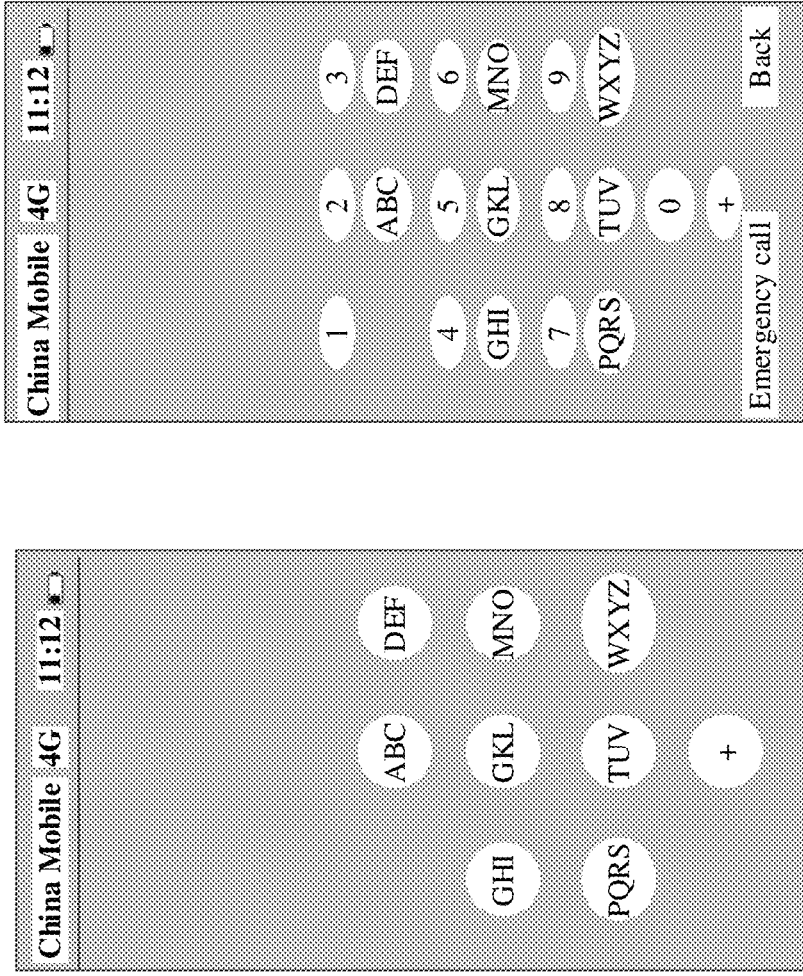
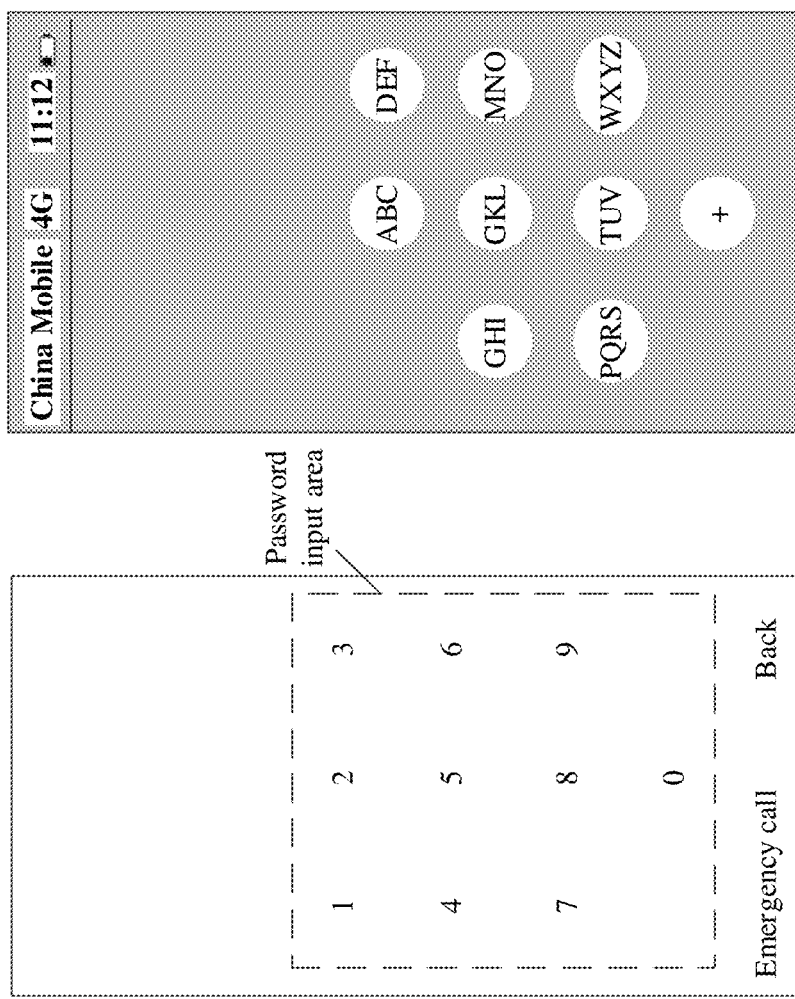
FIG. 5(a) First graph drawn by a TEE
FIG. 5(b) Second graph drawn by an REE
FIG. 5(c) A graph after the first graph and the second graph are fused An SMS message application in an REE receives a notification message

IMAGE DISPLAY METHOD AND ELECTRONIC DEVICE

CROSS-REFERENCE TO RELATED APPLICATIONS

This application is a continuation of International Application No. PCT/CN2020/110337, filed on Aug. 20, 2020, which claims priority to Chinese Patent Application No. 201911082843.X, filed on Nov. 7, 2019 and Chinese Patent Application No. 201911016209.6, filed on Oct. 24, 2019. The disclosures of the aforementioned applications are hereby incorporated by reference in their entireties.

TECHNICAL FIELD

This application relates to the field of security verification technologies, and in particular, to an image display method and an electronic device.

BACKGROUND

As functions of electronic devices become more powerful, more applications (apps) are installed, and more applications involve user private information, for example, various mobile banking APPs.

In the early days, an electronic device supports only a rich execution environment (REE) architecture, for example, an Android architecture. All applications in the electronic device run in an REE. However, a security level of the REE is low, and user privacy information is easily stolen. To prevent the user privacy information from being disclosed, the industry proposes a trusted execution environment (TEE). With hardware support, the TEE may provide secure runtime space for an application. Therefore, electronic devices based on an REE+TEE architecture emerge. When an application runs in a TEE, security is high, and when the application runs in an REE, security is low. Therefore, an application or a service involving user privacy information is transferred to the TEE for running, to ensure data security.

There are two secure runtime mechanisms in the existing REE+TEE architecture.

Mechanism 1: When an application runs in the TEE, the REE controls a display interface, a user enters information such as a password on the display interface, and the REE sends the detected password to the TEE for security authentication.

Mechanism 2: When an application runs in the TEE, the TEE controls a display interface, a password or the like entered by a user on the display interface is detected by the TEE, and then security authentication is performed. The password input does not pass the REE. The display interface controlled by the TEE is referred to as a trusted user interface (TUI).

Mechanism 1 is based on a powerful drawing capability of the REE. Therefore, when the application runs in the TEE, the electronic device presents a rich display interface. However, because security of the REE is low, the password is easily stolen after being detected by the REE, and security is low. Although the problem of low security in Mechanism 1 is resolved in Mechanism 2, there are defects as follows.

(1) Limited to a processing capability of the TEE, the TUI controlled by the TEE is usually dull, and there are less applications or services run in the TEE. When the electronic device controls the TUI, related information of the applications or services run in the REE cannot be displayed in the TUI. For example, when the electronic device controls the TUI, if an application in the REE receives a new message or notification, the TEE cannot display the new message and notification in the TUI, and therefore, visual interaction experience of the TUI is poor.

(2) Sensitivity of an interactive operation of the user on the TUI is poor. For example, only limited operation types (for example, a button click) can be identified, and input operations such as performing a full-screen gesture and sliding up/sliding down a menu cannot be identified and processed. Therefore, currently, the TUI provides the user with an inflexible touch response, and user experience is poor.

Therefore, both the foregoing two mechanisms have inevitable defects and cannot meet a requirement of the user.

SUMMARY

An objective of this application is to provide an image display method and an electronic device, to improve visual interaction experience of a TUI.

The foregoing objective and another objective may be achieved by using features in independent claims. Further implementations are reflected in the dependent claims, the specification, and the accompanying drawings.

According to a first aspect, an image display method is provided, and is applied to an electronic device that includes a trusted execution environment (TEE) and an execution environment rich (REE), for example, a mobile phone or a tablet computer. The method includes: A TEE in an electronic device draws a first graph, and displays the first graph on a first layer in a display screen of the electronic device; and an REE draws a second graph, and displays the second graph on a second layer in the display screen, where the first layer is located above the second layer; and the first graph includes a transparent area and a non-transparent area, the non-transparent area includes content drawn by the TEE, a display area that is on the second graph and that corresponds to the transparent area includes content drawn by the REE, and when the first layer and the second layer are overlapped for displaying, the transparent area does not shield the content drawn by the REE.

Therefore, when the first layer and the second layer are overlapped for displaying, a finally presented display effect is that a display interface includes both the content provided by the TEE and the content provided by the REE. To be specific, with the help of a powerful drawing capability and rich display resources of the REE, the second graph may include rich information, for example, a status bar and a background. Therefore, a rich display interface, namely, a TUI, is finally obtained. This resolves a problem in an existing mechanism that the TUI is dull when the TEE controls the display screen.

The first layer and the second layer may be determined in a plurality of manners, for example, in the following Manner 1 and Manner 2.

Manner 1: A touch screen in the electronic device is located on an upper layer of the display screen, the display screen includes a plurality of layers, the first layer is one or more layers close to the touch screen, and the second layer is one or more layers away from the touch screen.

It may be understood that layers on the display screen are overlapped for displaying, and a layer located on an upper layer shields a layer located on a lower layer. The layer located on the upper layer is a layer close to the touch screen, and the layer located on the lower layer is a layer away from the touch screen. Therefore, in this embodiment of this application, the TEE displays the first graph on one or more layers that are in the display screen and that are close to the touch screen, the REE displays the second graph on one or more layers that are in the display screen and that are away from the touch screen. Because the first graph includes the transparent area, when the first graph and the second graph are overlapped for displaying, the transparent area in the first graph does not shield the content drawn by the REE in the second graph. Richness of the TUI is improved with the help of the powerful drawing capability of the REE.

Manner 2: The first layer is a layer closest to a touch screen in the display screen, and the second layer is another layer other than the first layer in the display screen.

It is assumed that the display screen includes a layer 1 to a layer N, the layer 1 is closest to the touch screen, and the layer N is farthest from the touch screen. The TEE displays the first graph on the layer 1 of the display screen, and the REE displays the second graph on one or more layers in a layer 2 to the layer N. It may be understood that a processing capability of the TEE is limited because of a standard specification of a global platform (global platform, GP). Therefore, if the TEE controls only the layer 1, graph drawing stress of the TEE may be alleviated, and an effect of enriching the TUI can be implemented.

In a possible design, the TEE may determine, from one or more display templates based on a current scenario, a display template corresponding to the current scenario; and then the TEE draws the first graph based on the display template, and the REE draws the second graph based on the display template.

The current scenario may be an application currently run in the TEE or a service in an application currently run in the TEE. After the TEE determines the display template based on the current scenario, the REE draws a graph by using a same display template. This may be specifically implemented in the following Manner 1 to Manner 3.

Manner 1: After determining a proper display template based on the current scenario, the TEE sends an identifier of the display template to the REE, and then the REE draws a graph based on the display template corresponding to the identifier.

Manner 2: After determining a proper display template based on the current scenario, the TEE sends the display template to the REE, and the REE draws a graph by using the display template.

Manner 3: The TEE may alternatively determine a display template together with the REE. Specifically, the TEE and the REE may determine the display template through negotiation by sending information.

It should be understood that the foregoing three manners are merely examples, and are not limited. Another manner in which the TEE and the REE can use a same display template may also be used. When the same display template is used, the transparent area in the first graph drawn by the TEE corresponds to the content drawn by the REE on the second graph, thereby improving the richness of the display interface.

The display template may be implemented in a plurality of manners, for example, in the following Manner A and Manner B.

Manner A: The display template is a graph, the graph includes at least one display area, and each display area is configured as the content drawn by the TEE or the content drawn by the REE. It should be understood that in Manner A, the TEE and the REE may agree which area on the display template is drawn by the TEE and which area is drawn by the REE. When the TEE draws the first graph based on the display template, the content is drawn in an area drawn by the TEE on the display template, and another area is set to be a transparent area. When the REE draws the second graph based on the display template, the content is drawn in an area drawn by the REE on the display template. In this way, when the first graph and the second graph are overlapped for displaying, the transparent area in the first graph does not shield the content drawn by the REE in the second graph.

Manner B: The display template includes at least one graph, each graph corresponds to one layer on the display screen, and the graph is configured to be drawn by the TEE or drawn by the REE. It should be understood that it is assumed that the TEE controls the layer 1 and the REE draws the layer 2 to the layer N, the TEE draws the first graph based on a graph corresponding to the layer 1, and the REE draws the second graph based on graphs corresponding to the layer 2 to the layer N. There is no need to agree which area is drawn by the TEE and which area is drawn by the REE.

In a possible design, the content drawn by the TEE may include: information related to a password input. It should be understood that the graph drawing stress of the TEE may be alleviated by drawing less content. In this embodiment of this application, the TEE may draw only the information related to the password input, for example, a digital button value, and other content may be drawn with the help of the REE.

In a possible design, the TEE may further detect a user input, determine whether the user input needs a response from the TEE, and send the user input to the REE when the user input does not need a response from the TEE, where the REE performs a corresponding processing procedure in response to the user input.

As described above, the display interface of the electronic device includes both the content provided by the TEE and the content provided by the REE. A user may perform user input on the display interface. The user input may be for the content provided by the TEE or the content provided by the REE. Therefore, in this embodiment of this application, when detecting the user input, the TEE may determine whether the user input needs a response from the TEE. If the user input does not need a response from the TEE, the TEE sends the user input to the REE, so that the REE responds to the user input, thereby improving diversity and sensitivity of interactive operations of the user on the display interface (namely, the TUI).

A manner in which the electronic device determines whether the user input needs a response from the TEE may be implemented by: when the TEE determines that the user input is an input in an application currently run in the TEE, determining that the user input needs a response from the TEE; and when the TEE determines that the user input is not the input in the application, determining that the user input does not need a response from the TEE.

In this embodiment of this application, when the application runs in the TEE, the display interface includes the content provided by the TEE and the content provided by the REE. After the TEE detects the user input, if it is determined that the user input is the input in the application (for example, the password input), the TEE responds to the user input, to ensure security. When the TEE determines that the user input is not the input in the application, the TEE sends the user input to the REE, so that the REE responds to the user input, thereby improving the diversity and the sensitivity of the interactive operations of the user on the display interface (namely, the TUI).

A manner in which the TEE determines whether the user input is the input in the application or is not the input in the application may be at least one of the following manners.

Manner 1: The first graph drawn by the TEE includes a transparent area and a non-transparent area, and the non-transparent area includes information drawn by the TEE. Therefore, the TEE determines whether a touch location of the user input is located in the non-transparent area. If the touch location of the user input is located in the non-transparent area, it is determined that the user input is the input in the application; or if the touch location of the user input is not located in the non-transparent area, it is determined that the user input is not the input in the application. That is, the TEE responds only to a user input whose touch location is located in the non-transparent area.

Manner 2: The TEE determines whether an operation type of the user input is a preset operation type, where the preset operation type includes a click operation, a long press operation, and the like. If the operation type of the user input is a preset operation type, it is determined that the user input is the input in the application; or if the operation type of the user input is not a preset operation type (for example, a slide-up or slide-down operation), it is determined that the user input is not the input in the application. That is, the TEE responds only to a user input whose operation type is the preset operation type. It may be understood that a gesture operation, for example, slide-up/slide-down, is usually not an operation used to enter a password. Therefore, the TEE sends the gesture operation, for example, slide-up/slide-down, to the REE for a response.

It should be noted that Manner 1 and Manner 2 may be used separately, or Manner 1 may be used in combination with Manner 2 to improve accuracy. Specifically, the input in the application includes: an input located in the non-transparent area and/or an input whose operation type meets the preset operation type; and an input that is not in the application includes: an input located outside the non-transparent area and/or an input whose operation type is not the preset operation type.

In a possible design, when an application in the REE receives a notification message, the REE updates the second graph, where the notification message is displayed in a display area that is in an updated second graph and that corresponds to the transparent area in the first graph; and the REE displays the updated second graph in the second layer.

It should be noted that in an existing TEE+REE architecture, the TUI is displayed when the application runs in the TEE. When the application in the REE receives the notification message, the TEE cannot obtain the notification message, and the REE does not participate in drawing of the TUI. Therefore, the notification message cannot be displayed in the TUI. However, in this embodiment of this application, when the electronic device displays the TUI, and when the application in the REE receives the notification message, the REE may update the second graph, and the notification message is included in the display area that is in the updated second graph and that corresponds to the transparent area in the first graph. Therefore, the notification message may be displayed in the TUI, thereby improving the richness of the TUI.

According to a second aspect, an electronic device is further provided. The electronic device includes a trusted execution environment TEE and a rich execution environment REE. The TEE includes a first processing module and a first display module, and the REE includes a second processing module and a second display module. The first processing module is configured to draw a first graph. The first display module is configured to display the first graph on a first layer in a display screen of the electronic device. The second processing module is configured to draw a second graph. The second display module is configured to display the second graph on a second layer in the display screen. The first layer is located above the second layer. The first graph includes a transparent area and a non-transparent area. The non-transparent area includes content drawn by the TEE. A display area that is on the second graph and that corresponds to the transparent area includes content drawn by the REE. When the first layer and the second layer are overlapped for displaying, the transparent area does not shield the content drawn by the REE.

In a possible design, a touch screen in the electronic device is located on an upper layer of the display screen, the display screen includes a plurality of layers, the first layer is one or more layers close to the touch screen, and the second layer is one or more layers away from the touch screen.

In a possible design, the first layer is a layer closest to the touch screen in the display screen, and the second layer is another layer other than the first layer in the display screen.

In a possible design, the first processing module is further configured to determine, from one or more display templates based on a current scenario, a display template corresponding to the current scenario. The first processing module is specifically configured to draw the first graph based on the display template, and the second processing module is specifically configured to draw the second graph based on the display template.

In a possible design, the display template is a graph, the graph includes at least one display area, and each display area is configured as the content drawn by the TEE or the content drawn by the REE. Alternatively, the display template includes at least one graph, each graph corresponds to one layer, and each graph is configured to be drawn by the TEE or drawn by the REE.

In a possible design, the content drawn by the TEE includes: information related to a password input.

In a possible design, the first processing module is further configured to: detect a user input, and determine whether the user input needs a response from the TEE; and when the user input does not need a response from the TEE, send the user input to the REE by using a first communications module in the TEE, where the REE performs a corresponding processing procedure in response to the user input.

In a possible design, when being configured to determine whether the user input needs a response from the TEE, the first processing module is specifically configured to: when it is determined that the user input is an input in an application currently run in the TEE, determine that the user input needs a response from the TEE; and when it is determined that the user input is not the input in the application, determine that the user input does not need a response from the TEE.

In a possible design, the input in the application includes: an input located in the non-transparent area and/or an input whose operation type meets a preset operation type. An input that is not in the application includes: an input located outside the non-transparent area and/or an input whose operation type is not the preset operation type.

In a possible design, the first processing module is further configured to: when an application in the REE receives a notification message, update the second graph, where the notification message is displayed in a display area that is in an updated second graph and that corresponds to the transparent area in the first graph. The second display module is further configured to display the updated second graph in the second layer.

According to a third aspect, an electronic device is further provided. The electronic device is deployed with a trusted execution environment TEE and a rich execution environment REE, and further includes a display screen, a processor, and a memory. The memory stores a computer program, and the computer program includes instructions. When the instructions are executed by the processor, the electronic device is enabled to implement the image display method provided in the first aspect.

According to a fourth aspect, a computer storage medium is further provided. The computer storage medium stores a computer program, and when the computer program runs on an electronic device deployed with a trusted execution environment TEE and a rich execution environment REE, the electronic device is enabled to implement the image display method provided in the first aspect.

According to a fifth aspect, a computer program is further provided. The computer program includes instructions. When the instructions run on a computer deployed with a trusted execution environment TEE and a rich execution environment REE, the computer is enabled to implement the image display method provided in the first aspect.

According to a sixth aspect, a chip is further provided. The chip can run in a trusted execution environment TEE and a rich execution environment REE, and the chip is configured to read a computer program stored in a memory, to implement the image display method provided in the first aspect.

According to a seventh aspect, a graphical user interface on an electronic device is further provided. The electronic device is deployed with a trusted execution environment TEE and a rich execution environment REE, and further includes a display screen, one or more memories, and one or more processors. The one or more processors are configured to execute one or more computer programs stored in the one or more memories; and the graphical user interface includes a graphical user interface displayed when the electronic device performs the image display method provided in the first aspect.

BRIEF DESCRIPTION OF DRAWINGS

FIG. 5(a), FIG. 5(b), and FIG. 5(c) are schematic diagrams of a first graph, a second graph, and a fused graph according to an embodiment of this application;

DESCRIPTION OF EMBODIMENTS

Figure 1:
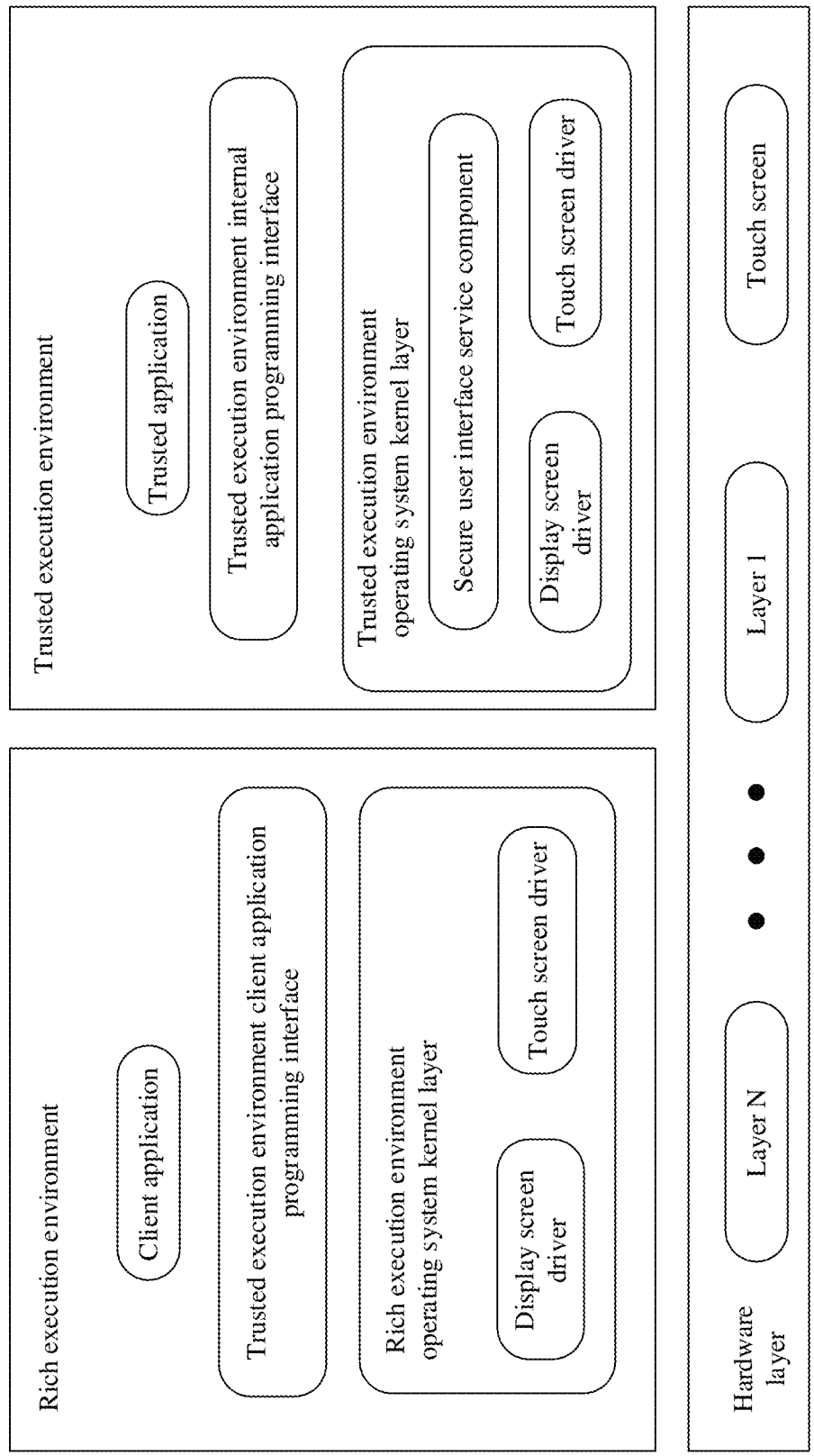
FIG. 1 is a schematic diagram of an existing TEE+REE architecture.

The following describes technical solutions in embodiments of this application with reference to the accompanying drawings in embodiments of this application.

Terms used in the following embodiments are merely intended to describe specific embodiments, but are not intended to limit this application. The terms "one", "a", "the", "the foregoing", "this", and "the one" of singular forms used in this specification and the appended claims of this application are also intended to include plural forms such as "one or more", unless otherwise specified in the context clearly. It should be further understood that, in embodiments of this application, "one or more" means one, two, or more. In addition, "and/or" describes an association relationship between associated objects, and indicates that three relationships may exist. For example, A and/or B may indicate cases in which only A exists, both A and B exist, and only B exists, where A and B may be singular or plural. The character "/" usually represents an "or" relationship between the associated objects.

Reference to "an embodiment", "some embodiments", or the like described in this specification indicates that one or more embodiments of this application include a specific feature, structure, or characteristic described with reference to the embodiments. Therefore, in this specification, statements, such as "in an embodiment", "in some embodiments", "in some other embodiments", and "in other embodiments", that appear at different places do not necessarily mean referring to a same embodiment, instead, they mean "one or more but not all of the embodiments", unless otherwise specifically emphasized in other ways. The terms "include", "contain", "have", and variants of the terms all mean "include but are not limited to", unless otherwise specifically emphasized in other ways.

The following explains some terms in embodiments of this application, to help understanding of a person skilled in the art.

(1) An electronic device involved in the embodiments of this application may be any electronic device that supports an REE+TEE architecture, for example, a mobile phone (mobile phone), a tablet computer, a notebook computer, a palmtop computer, a mobile internet device (MID), a wearable device (for example, a watch, a wristband, or a smart helmet), a virtual reality (VR) device, an augmented reality AR) device, an ultra-mobile personal computer (UMPC), a netbook, a personal digital assistant (PDA), a wireless terminal in industrial control, a wireless terminal in self driving, a wireless terminal in a remote medical surgery, a wireless terminal in a smart grid, a wireless terminal in transportation safety, a wireless terminal in a smart city, or a wireless terminal in a smart home.

It should be noted that the electronic device in the embodiments of this application may be alternatively any electronic device that supports two or more runtime environments. In this specification, an electronic device that supports an REE and a TEE is used as an example. However, this is not limited, and an electronic device that supports other two runtime environments may also be used.

(2) A rich execution environment (REE) is a runtime environment that does not have a specific security function in an electronic device. For example, an Android operating system is a rich execution environment.

It should be noted that in addition to being referred to as a "rich execution environment", the REE may be further referred to as an "untrusted execution environment", a "general execution environment", an "unsecure execution environment", or the like. This is not limited in the embodiments of this application.

(3) A trusted execution environment (TEE) is a runtime environment with a higher security capability. With hardware support, the TEE has a security capability and can meet a specific security requirement. The TEE defines a strict protection measure. Therefore, the TEE has a higher security level than an REE, can protect assets (such as data and software) in the TEE from a software attack, and resist a specific type of security threat.

(4) An REE+TEE architecture is an architecture that provides a service for an application by combining a TEE and an REE. That is, the TEE and the REE coexist in an electronic device. For example, with hardware support, the TEE can implement a runtime mechanism isolated from the REE. The TEE has runtime space, has a higher security level than the REE, and can protect assets (such as data and software) in the TEE from a software attack. Only authorized security software can be executed in the TEE. In addition, the TEE also protects confidentiality of resources and data of the security software. Compared with the REE, the TEE can better protect security of the data and the resources because of protection mechanisms of the TEE such as isolation and authorization control.

(5) A client application (CA) is usually an application run in an REE. The CA can invoke a TA under a specific condition. For example, if a service involving user information in the CA is triggered, the CA invokes the TA. For example, the CA can invoke the TA by using a client application programming interface (API). After the CA invokes the TA, the TA runs in a TEE to perform a related security operation.

(6) A trusted application (TA) is an application run in a TEE, and can provide a security-related service for a client application (CA) run outside the TEE. It may be understood that one CA corresponds to one TA (for example, a TA provides different services for a corresponding CA), one CA may correspond to a plurality of TAs (for example, different services in one CA correspond to different TAs), or the like. This is not limited in the embodiments of this application.

(7) A trusted user interface (TUI) is a security function provided by a TEE operating system, may be understood as a secure display interface controlled by the TEE, and can provide a trusted user interaction interface for each TA run in the TEE, to ensure that when the TA runs in the TEE, displayed content cannot be acquired by an REE, thereby improving security of a service. A global platform standardizes common APIs of the TUI, so that a TA developer uses these APIs to develop the TUI. By using the TUI, three most basic secure user interaction functions can be implemented: secure display, secure input, and secure indication mark. For example, in the financial field, in a mobile phone key specification of the central bank, it is clearly required to ensure security of a display interface for password input and signature content by using the TUI.

Currently, because a processing capability of the TEE is limited, for example, a drawing capability is weak, the TUI controlled by the TEE is dull, and rich content cannot be presented.

(8) A mobile phone key is a product or an application program that implements functions of a USB key of a bank by using a mobile phone. The mobile phone key can implement a related service in a mobile phone that supports a TEE+REE architecture, and a TEE in the mobile phone can provide a high-security environment required for all functions such as cryptographic operation and a CA digital certificate of the mobile phone key. The mobile phone key provides a cryptographic operation support capability for mobile internet applications, and is used for identity authentication, electronic signature, and data protection.

The following uses a mobile phone key service as an example, to describe a service execution process in an existing TEE+REE security architecture. In the TEE+REE architecture, a signature key of the mobile phone key is stored in a TEE, and all signature operations are performed in the TEE, to ensure that a signing process reaches financial-level security. A user may perform some high-value transactions or other highly sensitive operations on a mobile phone. When a service needs to be performed by using a signature of a mobile phone key, to-be-signed information is sent to a TEE, and is displayed by using a TUI and confirmed by the user. The user enters a personal universal identification number (personal identification number, PIN) of the mobile phone key after confirming that the to-be-signed information is correct. The PIN is sent to a signature applet in the TEE for verification. After the verification succeeds, the transaction information confirmed by the user is sent to the applet for signature, to ensure non-repudiation of the transaction by using a digital signature technology.

In the execution procedure of the mobile phone key service, the TUI has two important functions: 1. Security when the user enters the PIN is ensured, only the mobile phone key can obtain input information, and an application on an REE side cannot obtain a user input in a manner of screen reading or keyboard reading. Therefore, it is ensured that the PIN is not disclosed, and real-time input of the PIN can be ensured at the same time. 2. "What you see is what you sign" (or "what you sign is what you see") is ensured. To be specific, it is ensured by using the TUI that the transaction information sent to the mobile phone key for signature is not tampered with or replaced. In this way, after the user confirms that the transaction information is correct, the information sent to the TEE for signature is the information confirmed by the user. Currently, it is widely considered in the industry that the REE side is unsecure and various attack manners may be implemented. Without introduction of the TEE, transaction information, a user PIN, and the like may be obtained or tampered with by a malicious program. Consequently, the malicious program/a hacker can skip a user for transaction or modify transaction content for fraud. Obviously, introduction of the TUI plays a significant defensive role against possible malicious attacks on the REE side. However, as described above, because the drawing capability of the TEE is weak, the TUI is dull and cannot present rich content. A display method in the embodiments of this application aims to improve richness of a TUI.

(9) An application in embodiments of this application may be referred to as an application for short, and is a software program that can implement one or more specific functions. Generally, a plurality of applications may be installed in an electronic device, for example, an instant messaging application, a video application, an audio application, an image shooting application, and a payment application. The instant messaging application may include, for example, a "Messages" application, WeChat, WhatsApp Messenger, LINE, image sharing (instagram), Kakao Talk, and DingTalk. The image shooting application may include, for example, a camera application (a system camera or a third-party camera application). The video application may include, for example, Youtube, Twitter, TikTok, iQIYI, and Tencent Video. The audio application may include, for example, KuGou, EMUMO, and QQ music. The payment applications are, for example, Alipay, WeChat, and various banking APPs. The application mentioned in the following embodiments may be an application installed when the electronic device is delivered from a factory, or may be an application downloaded by a user from a network or obtained by another electronic device in a process of using the electronic device.

(10) In embodiments of this application, "at least one" means one or more, and "a plurality of" means two or more. In addition, it should be understood that in description of this application, terms such as "first" and "second" are merely used for distinguishing and description, but should not be understood as indicating or implying relative importance, or should not be understood as indicating or implying a sequence. The term "and/or" describes an association between associated objects and indicates that three relationships may exist. For example, A and/or B may indicate the following three cases: Only A exists, both A and B exist, and only B exists. The character "/" usually represents an "or" relationship between the associated objects.

FIG. 1 is a schematic diagram of an existing TEE+REE architecture. As shown in FIG. 1, the architecture includes a TEE and an REE. A CA may run in the REE, and a TA may run in the TEE.

The architecture may implement Mechanism 2. When the CA runs in the REE, the REE controls a display screen and a touch screen. When the TA runs in the TEE, the TEE controls the display screen and the touch screen. Specifically, the CA may control the display screen by using a display screen driver (DSD) in a rich execution environment operating system kernel (REE OS kernel), and control the touch screen by using a touch screen driver (TSD) in the REE OS kernel. The TA may control the display screen by using a DSD in a trusted execution environment operating system kernel TEE OS kernel), and control the touch screen by using a TSD in the TEE OS kernel. That is, when the TA runs in the TEE, the display screen displays display content provided/drawn by the TEE, and the TEE detects a user operation (for example, password input) on the touch screen.

Figure 2:
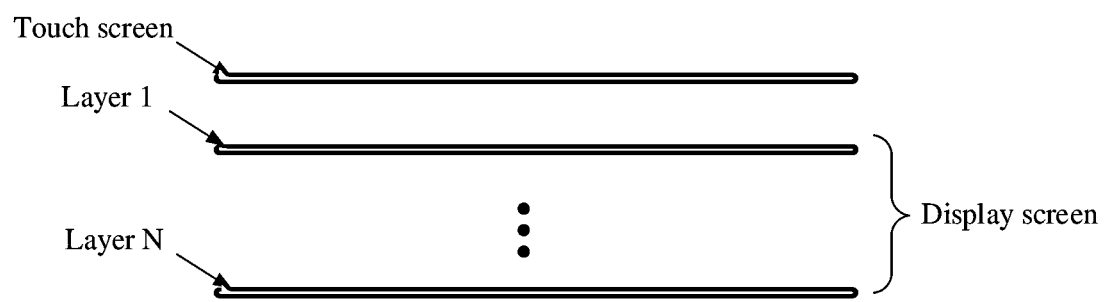
FIG. 2 is a schematic diagram of a logical structure of a display screen.

(1) Currently, when the TA runs in the TEE, a manner in which the TEE controls the display screen is implemented by controlling only a first layer in the display screen. Specifically, FIG. 2 is a schematic diagram of a logical structure of a display screen. The display screen includes a plurality of layers, for example, a layer 1 to a layer N. N is an integer greater than or equal to 2. The touch screen is on an upper layer of the layer 1. In an existing mechanism, when the CA runs in the REE, the REE exclusively occupies the display screen, that is, the REE controls all layers in the display screen. When the TA runs in the TEE, the TEE controls the layer 1 in the display screen. To be specific, the TEE draws only a first graph, and then displays the first graph on the layer 1. Because the first graph of the layer 1 shields graphs of lower layers, namely, graphs of a layer 2 to the layer N, a finally presented TUI includes only content on the layer 1, namely, the display content drawn by the TEE. However, due to a standard specification of a global platform (GP), a processing capability of the TEE is limited. Therefore, the TUI is usually dull, and can display only content such as some text, a button, and a text box, and other content such as a status bar (including: power information, operator information, time information, and the like) cannot be displayed.

(2) Currently, when the TA runs in the TEE, the TEE controls the touch screen. A user may trigger various user operations, for example, operations of performing a full-screen gesture and sliding up/sliding down a menu. These operations are related to services in the REE, and are not related to services in the TEE. The TEE cannot send these operations to the REE, and the TEE cannot respond to these operations. Therefore, when the user triggers various operations on the TUI, the TUI can identify only limited operation types (for example, a button click), and cannot identify and process other operations. Consequently, an existing TUI cannot provide rich human-machine interaction experience.

(3) Currently, when the TA runs in the TEE, a related service of the CA in the REE cannot be transmitted to the TEE. For example, when an electronic device controls the display screen to display the TUI, and when an application run in the REE receives a new message or notification, the new message or notification cannot be transmitted to the TEE. Consequently, the TEE cannot display the new message and notification in the TUI. Therefore, currently, interaction experience of the TUI is poor.

Based on the foregoing problems, an embodiment of this application provides an image display method. The method may be applied to an electronic device deployed with a TEE and an REE. The display method is a TEE+REE fusion display mechanism. Specifically, when a TA runs in a TEE, the TEE controls a layer 1 in a display screen, and an REE controls a layer 2 to a layer N in the display screen. The TEE draws a first graph, and displays the first graph on the layer 1; the REE draws a second graph, and displays the second graph on one or more layers in the layer 2 to the layer N; and the first graph and the second graph are fused (or referred to as superposed or overlapped) to obtain a TUI. The first graph includes a non-transparent area and a transparent area. The non-transparent area includes content drawn by the TEE, for example, password input information. The transparent area on the first graph does not shield display content of an area that is on the second graph and that corresponds to the transparent area. Therefore, a display effect after the first graph and the second graph are fused to be displayed is that a display interface, namely, the TUI, includes both the content drawn by the TEE and content drawn by the REE. To be specific, with the help of a powerful drawing capability and rich display resources of the REE, the second graph may include rich information, for example, a status bar and a background. Therefore, a rich display interface is finally obtained. This resolves the problem that the TUI is dull in (1).

In addition, when the electronic device displays the TUI, the REE may update the second graph. For example, when an application in the REE receives a notification message, the REE may add the notification message to the area that is on the second graph and that corresponds to the transparent area in the first graph. Therefore, the first graph on the layer 1 does not shield the notification message, and a finally presented display effect is that the notification message is displayed in the TUI. Therefore, the problem that the interaction experience of the TUI is poor in (3) is resolved.

Further, an embodiment of this application further provides an REE+TEE fusion input mechanism: A channel for transmitting a user input is established between an REE and a TEE. For example, the REE includes a communications module 1, and the communications module 1 is configured to receive information sent by the TEE. The TEE includes a communications module 2, and the communications module 2 is configured to receive information sent by the REE and send information to the REE. When a TA runs in the TEE, the TEE controls a touch screen. After detecting a user input on a TUI, the TEE determines whether the user input is processed by the TEE or the REE. If the user input is processed by the REE, the user input is sent to the REE through the channel. If the user input is processed by the TEE, an application in the TEE processes the user input. Therefore, the problem that the human-machine interaction experience of the TUI is poor in (2) is resolved. The communications module 1 and the communications module 2 may be inter-kernel communications modules, may be interprocess communications (IPC) modules, or other underlying hardware communications modules.

Figure 3:
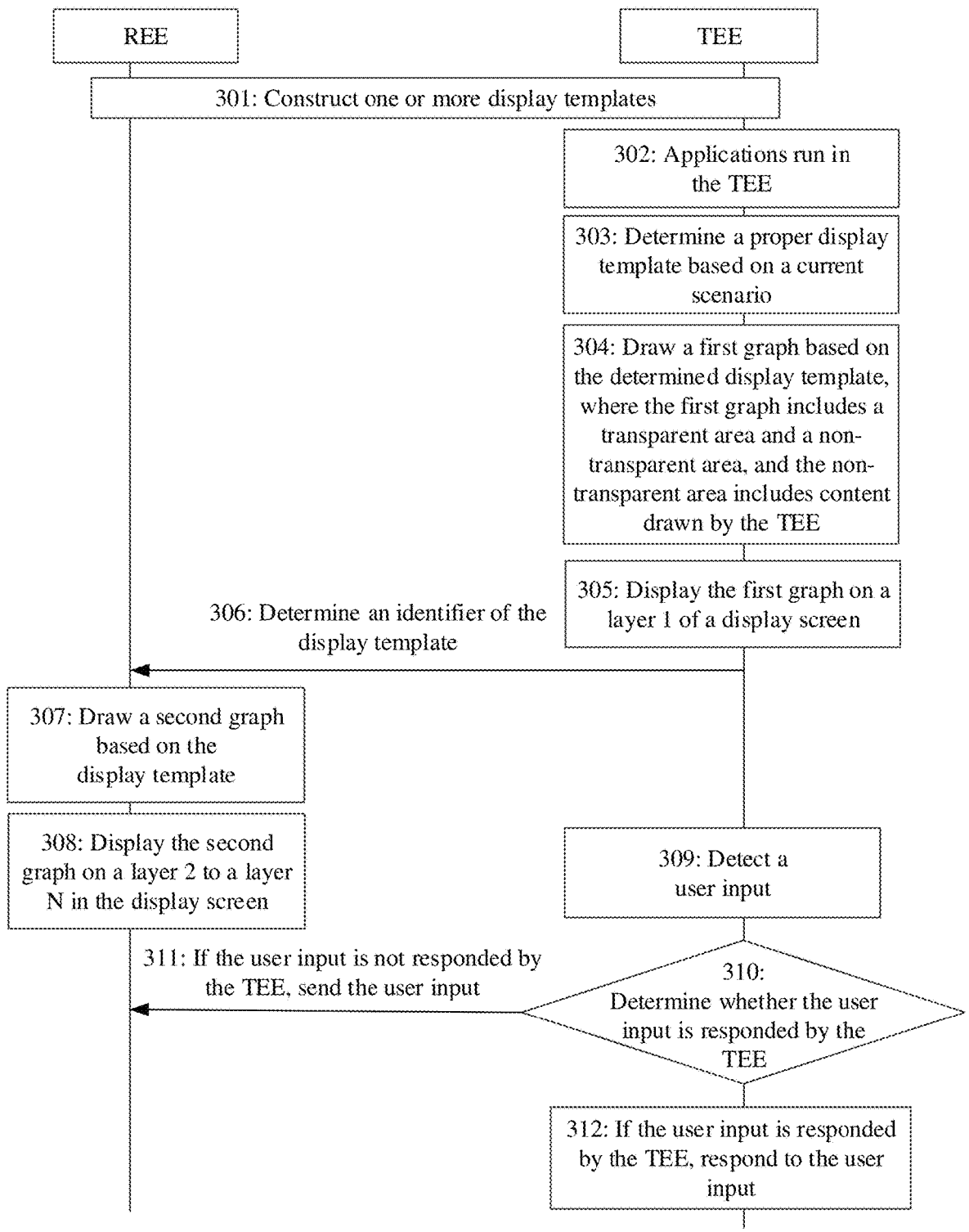
FIG. 3 is a schematic flowchart of an image display method according to an embodiment of this application.

The following describes in detail the TEE+REE fusion display mechanism and fusion input mechanism. FIG. 3 is a schematic flowchart of a display method of an electronic device that supports a TEE+REE architecture according to an embodiment of this application. As shown in FIG. 3, a procedure of the method includes the following steps.

301: Construct one or more display templates.

It may be understood that the display template is a reference template when a graph is drawn. In other words, the display template includes a layout (including a location, a size, and the like) of a display area, display content in each area, and the like. Manner A: A display template is a graph template. The graph template is divided into different areas, and each area is used to display corresponding content. A TEE and an REE may agree content of which area of the display template is provided by the TEE and content of which area is provided by the REE. For security reasons, the TEE and the REE may agree that content related to a password input in the display template is provided by the TEE, and other content is provided by the REE. In Manner A, the display template is simple.

Manner B: A display template includes a plurality of graph templates, and one graph template corresponds to one layer in a display screen. For example, the display template includes two graph templates. A graph template 1 corresponds to a layer 1 on the display screen, and a graph template 2 corresponds to a layer 2 on the display screen. When the TEE controls the layer 1 of the display screen, a first graph may be drawn with reference to the graph template 1. When the REE controls the layer 2 of the display screen, a second graph may be drawn with reference to the graph template 2. In Manner B, the TEE and the REE do not need to agree on to-be-drawn content, so that efficiency is improved.

Alternatively, the display template may not be needed, that is, drawing is performed based on drawing logic provided by an application or an operating system each time. A part that needs to be agreed between the REE and the TEE may be controlled by preset drawing logic.

It should be noted that 301 may be performed by the REE or the TEE. It is assumed that the REE constructs the display template, the display template may be sent to the TEE after being constructed; or it is assumed that the TEE constructs the display template, the display template may be sent to the REE after being constructed, provided that the TEE and the REE share the display template.

As an example, the display template is independent of an application. After one or more display templates are constructed by the TEE or the REE, a shared pool is formed. The shared pool includes the one or more display templates. When any application runs in the TEE, the TEE may select a display template from the shared pool for use. For example, a proper display template may be selected from the shared pool based on a current scenario (for example, an application that is currently run or a subdivided scenario in an application), which is specifically described later. It should be understood that the REE and the TEE need to use a same display template.

As another example, the display template is related to an application. For example, when the electronic device downloads an application, a display template corresponding to the application is downloaded together. For example, the display template may be provided by a provider corresponding to the application. The REE and the TEE may share a display template corresponding to each application. When an application runs in the TEE, a display template corresponding to the application is used.

It may be understood that there may be one or more display templates, and different scenarios may correspond to different display templates. For example, the scenarios may include:

Scenario 1: a USB key scenario, namely, a scenario in which the electronic device runs a USB key to implement a related service. The scenario may correspond to a display template.

Scenario 2: a lock screen scenario. To be specific, the electronic device is in a lock screen state and a dark screen state. After the electronic device detects an input operation, the electronic device is lit up and a lock screen interface is displayed, and the lock screen interface may correspond to a display template.

Scenario 3: an account login scenario. For example, the electronic device detects an input operation, and starts a first application, for example, a banking APP, in response to the input operation, to display an account login interface, where the account login interface may correspond to a display template.

Scenario 4: a transfer scenario. The electronic device runs a first application, for example, a banking APP. When an input operation is detected, and a security-related service (for example, a transfer service) in the first application is started in response to the input operation, a password input interface is displayed, and the password input interface may correspond to a display template.

It should be noted that the foregoing four scenarios are merely examples, but are not limited. Any scenario involving password input is applicable. Details are not described in this embodiment of this application.

Optionally, a plurality of scenarios may alternatively correspond to a same display template. For example, at least two scenarios in Scenario 1 to Scenario 4 correspond to a same display template. For example, Scenario 3 and Scenario 4 correspond to a same display template.

Figure 4A:
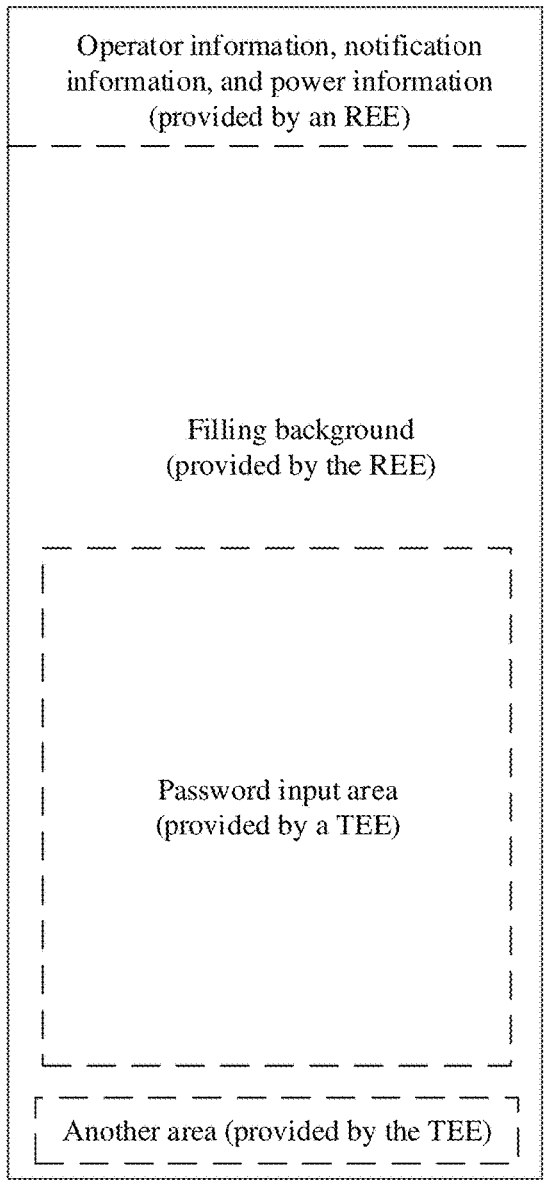
FIG. 4(a) and FIG. 4(b) are schematic diagrams of two display templates according to an embodiment of this application.
Figure 4B:
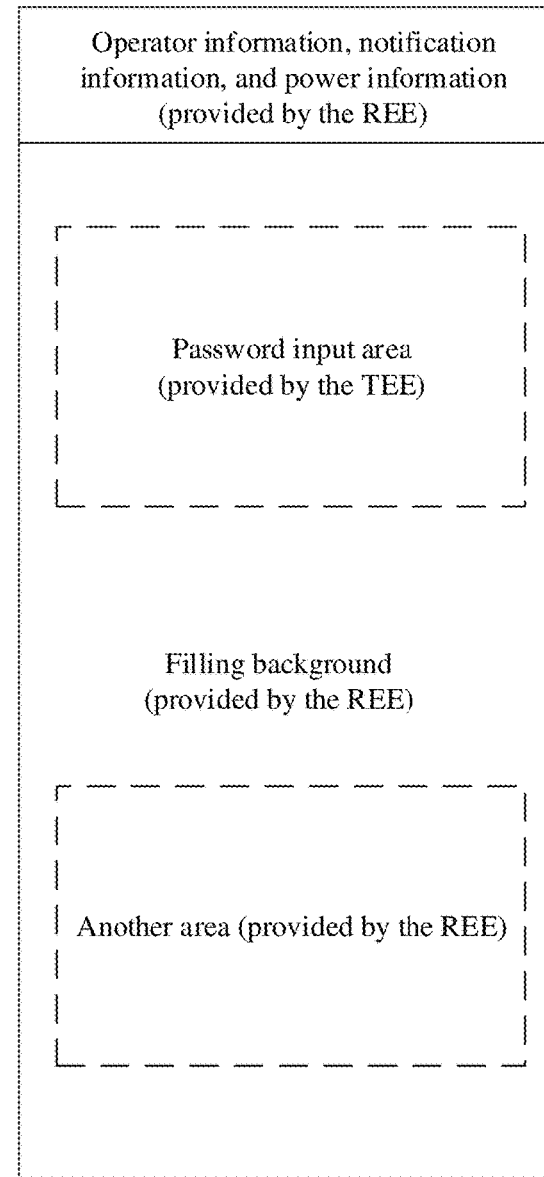

For example, Manner A is used as an example. FIG. 4(a) and FIG. 4(b) are schematic diagrams of two display templates according to an embodiment of this application. FIG. 4(a) is a schematic diagram of a display template 1 corresponding to a lock screen scenario, namely, Scenario 2, and FIG. 4(b) is a schematic diagram of a display template 2 corresponding to a banking APP login scenario, namely, Scenario 3. The display template 1 shown in FIG. 4(a) is used as an example. Some areas in the display template 1 display the content provided by the TEE, and the other areas display the content provided by the REE.

302: Applications run in the TEE.

The applications in 302 may be software authorized by the TEE, such as Alipay, a bank client, and a screen lock APP (screen lock App).

There may be a plurality of cases in 302. For example, in Case 1, the electronic device displays a home screen, and the home screen includes icons of one or more applications. It is assumed that an application lock is set for an application. When the electronic device detects an operation on an icon of the application, the application runs in the TEE, and an application lock interface of the application is displayed, including a password input area. In Case 2, an application runs in the REE. When a specific input operation is detected, the specific input operation is used to start a specific service in the application, for example, a service involving privacy information of a user, for example, transfer or payment. In response to the specific input operation, the application is switched to the TEE for running. The application is switched from the REE to the TEE for running, to be specific, a CA runs in the REE, then the CA invokes a TA corresponding to the CA in the TEE, and then the TA runs in the TEE.

303: The TEE determines a proper display template based on a current scenario.

Manner 1: An application is a scenario, and a scenario corresponds to a display template. Therefore, in 303, the TEE determines, based on a run application, a display template corresponding to the application. For example, when running a China Merchants Bank APP in the TEE, the electronic device may use a display template provided by the China Merchants Bank APP to draw a graph.

Manner 2: Different services in an application correspond to different scenarios, for example, an application includes a transfer service, a payment service, and the like, and different services correspond to different scenarios. The TEE may determine a corresponding display template based on a current scenario. For example, if it is determined that the current scenario is a lock screen scenario, the TEE selects the display template 1 shown in FIG. 4(a); or if it is determined that the current scenario is a transfer scenario, the TEE selects the display template 2 shown in FIG. 4(b).

One CA corresponds to one or more TAs, and the TAs are used to provide different security-related services for the CA. Therefore, when the CA in the REE invokes the TA corresponding to the CA in the TEE, the TEE may determine, based on the invoked TA, a currently run application or a service in a currently run application, to determine a proper display template.

For example, for Case 1, when detecting an operation on an icon of an application 1, the electronic device determines that an application lock is set for the application 1, the CA invokes a TA that is in the TEE and that is used to process a service related to the application lock in the application 1, and then the TA runs in the TEE. In this way, the TEE determines, based on the invoked TA, that the currently run application is the application 1, and then determines a proper display template. For another example, for Case 2, the application runs in the REE. When the specific input operation is detected, it is determined that the specific input operation is used to start a specific service in the application, a TA corresponding to the specific service is invoked in the TEE, and the TA runs in the TEE. Therefore, the TEE may determine, based on the TA, the currently run application and the service run in the application, and then determine a proper display template.

In some other embodiments, the TEE may alternatively determine a display template together with the REE. Specifically, the TEE and the REE may determine the display template through negotiation by sending information. In some other embodiments, the TEE may alternatively accept a display template determined by the REE.

304: The TEE draws a first graph based on the determined display template, where the first graph includes a transparent area and a non-transparent area, and the non-transparent area is content drawn by the TEE.

The foregoing describes two manners of constructing the display template, namely, Manner A and Manner B.

For Manner A, the TEE and the REE agree which area in the display template is provided by the TEE and which area is provided by the REE. For example, it is assumed that the display template determined by the TEE is the display template 1 shown in FIG. 4(a), and it is agreed that content of the password input area in the display template 1 is provided by the TEE. Therefore, the TEE may draw the first graph, where an area that is on the first graph and that corresponds to the password input area includes password input information, for example, a digital button value, and another area on the first graph is a transparent area. For example, the first graph drawn by the TEE is shown in FIG. 5(a), an area other than the digital button value on the first graph is a transparent area.

For Manner B, the display template includes a graph template corresponding to each layer. It is assumed that a graph drawn by the TEE is displayed on a first layer, and a graph drawn by the REE is displayed on a second layer to an $N^{th}$ layer, the TEE needs to draw the first graph based on only a graph template corresponding to the first layer.

305: The TEE displays the first graph on a first layer in a display screen.

Figure 6:
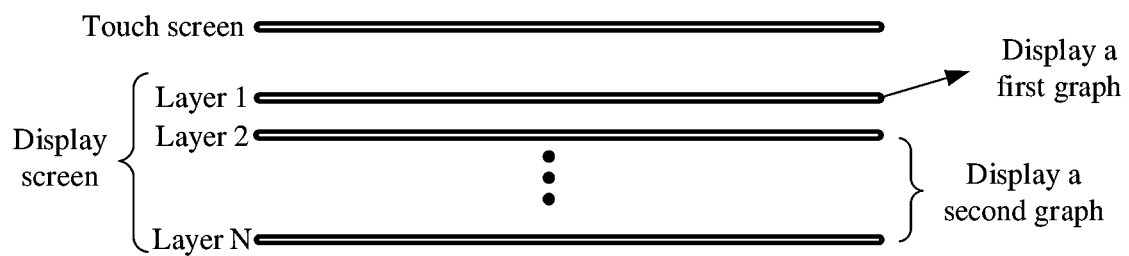
FIG. 6 is a schematic diagram of a logical structure of a display screen according to an embodiment of this application.

It may be understood that a touch screen in the electronic device is located on an upper layer of the display screen, and the display screen includes a plurality of layers. Therefore, the first layer in the display screen may be one or more layers close to the touch screen, for example, the first layer or the first layer and the second layer. As shown in FIG. 6, the display screen includes a plurality of layers, and a final TUI on the display screen is obtained by fusing (or referred to as superposing) graphs on the layers. The TEE may display the first graph on the first layer, for example, the layer 1.

306: The TEE sends an identifier of the display template to the REE.

It should be noted that a performing sequence between 306 and both of 304 and 305 is not limited in this embodiment of this application.

It may be understood that the TEE and the REE share the display template. After the TEE sends the identifier of the display template to the REE, the REE may determine the corresponding display template based on the identifier.

307: The REE draws a second graph based on the display template.

For Manner A, the TEE and the REE agree which area in the display template needs to be provided by the TEE and which area needs to be provided by the REE. For example, it is assumed that the display template determined by the TEE is the display template 1 shown in FIG. 4(a), and it is agreed that only content of the "password input area" in the display template 1 is provided by the TTE, and content of another area is provided by the REE. Therefore, the REE draws the second graph based on the display template. In a simple manner, the REE may draw only an area that is on the second graph and that corresponds to the transparent area on the first graph, and does not draw an area corresponding to the non-transparent area. Certainly, the REE may alternatively draw the entire second graph.

For Manner B, because the display template includes the graph template corresponding to each layer, it is assumed that the first layer displays the graph drawn by the TEE, and the second layer to the $N^{th}$ layer display the graph drawn by the REE, the REE draws the second graph based on graph templates corresponding to the second layer to the $N^{th}$ layer.

308: The REE displays the second graph on a second layer in the display screen.

It should be noted that 307 and 308 may be performed before 303, 304, or 305. That is, the REE first draws the second graph, and then the TEE draws the first graph; or the TEE first draws the first image, and then the REE draws the second graph. This is not limited in this embodiment of this application. When 307 is performed before 303, the REE may determine a proper display template based on a current scenario, and then send an identifier of the display template to the TEE, provided that the TEE and the REE use a same display template.

The touch screen in the electronic device is located on the upper layer of the display screen, and the display screen includes a plurality of layers. Therefore, the second layer in the display screen may be one or more layers far away from the touch screen. For example, the "first layer" in 305 may be the first layer, and the "second layer" in 308 may be the second layer to the $N^{th}$ layer. Alternatively, the "first layer" may be the first layer to the third layer, and the "second layer" may be the fourth layer to the $N^{th}$ layer. This is not limited in this embodiment of this application.

As shown in FIG. 6, the first graph is displayed on the layer 1, and the second graph is displayed on the layer 2 to the layer N. It is assumed that the second graph generated by the REE is shown in FIG. 5(b), the first graph drawn by the TEE is shown in FIG. 5(a), the first graph is displayed on the layer 1, the transparent area in the first graph cannot cover content of a corresponding area on the second graph, and the first graph and the second graph are fused to obtain the final display interface. For example, the display interface finally obtained through fusion is an interface shown in FIG. 5(c). Therefore, when the application runs in the TEE, the display interface includes not only the content provided by the TEE, but also the content provided by the REE, including, for example, a status bar and a background. Therefore, rich content is displayed.

It should be noted that the lock screen scenario is used as an example. In the existing TEE+REE architecture, the lock screen interface is an interface generated by the REE. Because the REE has a powerful drawing capability, the lock screen interface includes rich information, such as a status bar (including information such as a time, an operator, and a power). However, because security of the REE is low, when a user enters an unlock password on the lock screen interface, it is easy to disclose the password. In the display method provided in this embodiment of this application, the lock interface in FIG. 5(c) is a TUI obtained after the first graph drawn by the TEE and the second graph drawn by the REE are fused, and key information such as the password input information in the display interface is drawn by the TEE, and other information is drawn by the REE. Therefore, the REE cannot learn about the password input information, so that security is improved. In addition, richness of the TUI is improved by using the drawing capability of the REE.

Figure 7:
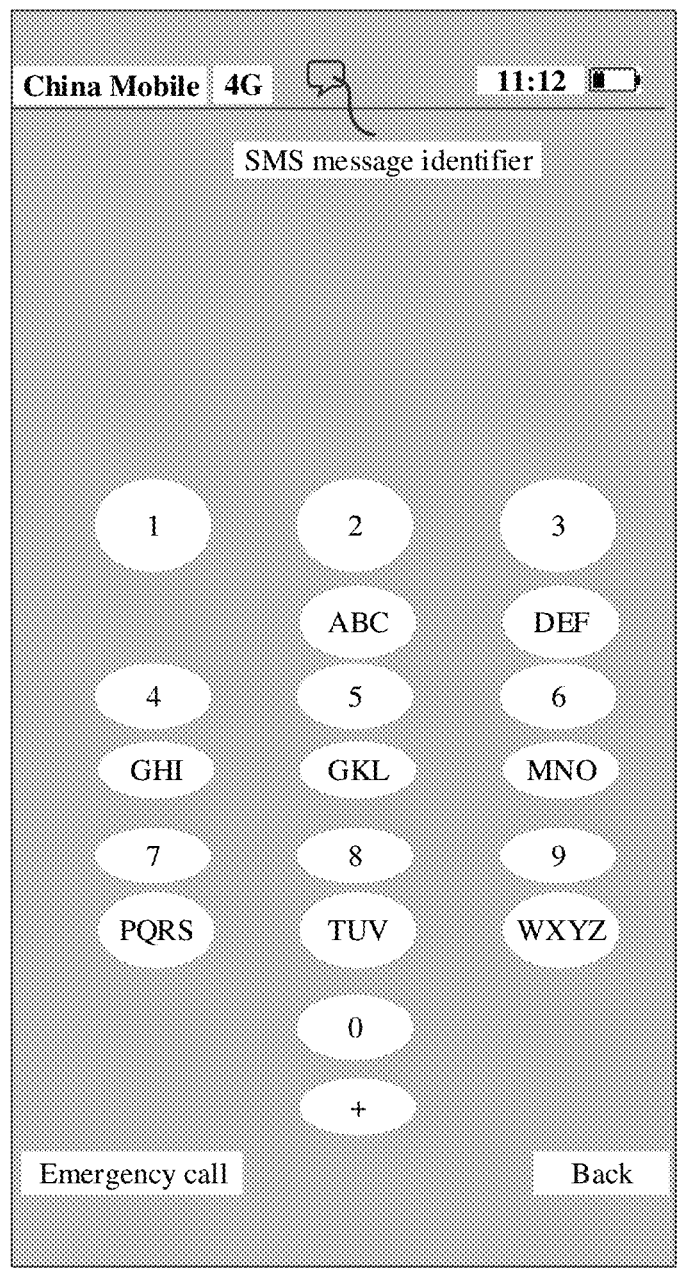
FIG. 7 is a schematic diagram of a display interface when a notification message is received by an application in an REE according to an embodiment of this application.

It should be noted that when the application runs in the TEE, the application in the REE may receive a notification message. In this case, the REE may update the second graph, for example, add the notification message to an area that is on the second graph and that corresponds to the transparent area in the first graph. Therefore, after the first graph and an updated second graph are fused/overlapped, the notification message is displayed. With reference to FIG. 5(c) and FIG. 7, FIG. 5 (c) is an interface after the first graph drawn by the TEE and the second graph drawn by the REE are fused. In this case, if the SMS message in the REE receives the notification message, the REE draws the notification message in the area (for example, a status bar area) that is on the second graph and that corresponds to the transparent area in the first graph. Therefore, after the first graph and the updated second graph are fused, the notification message is displayed, as shown in FIG. 7.

It should be noted that in the existing TEE+REE architecture, the TUI is displayed when the application runs in the TEE. When the application in the REE receives the notification message, the TEE cannot obtain the notification message, and the REE does not participate in drawing of the TUI. Therefore, the notification message cannot be displayed in the TUI. However, in this embodiment of this application, when the electronic device displays the TUI, and when the application in the REE receives the notification message, the TUI may display the notification message, thereby improving the richness of the TUI.

It may be understood that, until 308, the TUI on the display screen of the electronic device is an interface after the first graph drawn by the TEE and the second graph drawn by the REE are fused, and the user may perform user input on the TUI. In this embodiment of this application, the TEE+REE fusion input mechanism is specifically implemented by using the following steps 309 to 311.

309: The TEE detects a user input.

It should be noted that after 302, the TEE controls the touch screen, that is, the TEE detects the user input on the touch screen. For example, it is assumed that the electronic device displays the TUI shown in FIG. 5(c). Some content in the TUI is provided by the TEE, and some content is provided by the REE. The user may perform any operation, for example, a slide-up/slide-down operation, at any location on the TUI. Therefore, after detecting the user input, the TEE may determine whether the user operation is responded by the TEE or the REE, namely, 310.

310: The TEE determines whether the user input is responded by the TEE or the REE.

It may be understood that when the application runs in the TEE, the TEE draws the first graph based on the display template, where the first graph includes information related to the application, for example, the password input information. Therefore, the TEE may determine whether the user input is an input in the application (hereinafter, the input in the application is intra-APP input for short) or an input that is not in the application (hereinafter, the input that is not in the application is non-intra-APP input for short). The intra-APP input includes an intra-APP control information input and an intra-APP text information input. The intra-APP text information input is, for example, a password entered in the TUI. Another non-intra-APP text information input, for example, an input implemented by clicking a back button on the TUI or clicking a button used to adjust a keyboard input method, is the intra-APP control information input. The non-intra-APP input includes, for example, inputs that are not in the application and that are implemented through a full-screen gesture operation, a menu sliding-down operation, and a virtual button operation at a bottom of a screen.

Manner 1: The TEE sends the non-intra-APP input to the REE for processing, and sends the intra-APP input to an internal application of the TEE for processing. It may be understood that before the TEE sends the non-intra-APP input to the REE, a TUI service is exited, to release the touch screen and the layer 1 of the display screen, and clean the content in the layer 1. After receiving the non-intra-APP input, the REE outputs a response by using the layer 1 to the layer N. In this method, when the application runs in the TEE, all intra-APP inputs are processed by the TEE without passing through the REE, so that security is high.

Manner 2: The TEE sends the non-intra-APP input and the intra-APP control information input to the REE for processing, and sends the intra-APP text information input to an internal application of the TEE for processing. In this method, when the application runs in the TEE, only the intra-APP text information input (for example, the password input) is processed by the TEE, and other inputs are processed by the REE, to relieve processing pressure of the TEE.

FIG. 5(c) is used as an example, when a screen lock application (screen lock App) runs in the TEE, the first graph drawn by the TEE includes only the digital button value. After detecting a user input password, the TEE determines that the user input is an intra-APP text information input, and sends the user input to the screen lock application in the TEE for processing. If it is determined that the user input is an intra-APP control information input, for example, clicking a back button, the user input may be sent to the REE, or the user input may be sent to the screen lock application in the TEE.

A manner in which the TEE determines whether the user input is an intra-APP input or a non-intra-APP input may be at least one of the following manners.

Manner 1: In 304, the first graph drawn by the TEE includes a transparent area and a non-transparent area, and the non-transparent area includes information drawn by the TEE. Therefore, the manner in which the TEE determines whether the user input is an input in the application or an input that is not in the application may be implemented by: determining whether a touch location of the user input is located in the non-transparent area; and if the touch location of the user input is located in the non-transparent area, determining that the user input is an input in the application; or if the touch location of the user input is not located in the non-transparent area, determining that the user input is an input that is not in the application.

Manner 2: The manner in which the TEE determines whether the user input is an intra-APP input or a non-intra-APP input may be alternatively implemented by: determining whether an operation type of the user input is a preset operation type, where the preset operation type includes a click operation, a long press operation, and the like; and if the operation type of the user input is a preset operation type, determining that the user input is an intra-APP input; or if the operation type of the user input is not a preset operation type (for example, a slide-up or slide-down operation), determining that the user input is a non-intra-APP input. It may be understood that a slide-up/slide-down gesture operation, or the like is usually not an operation used to enter a password. Therefore, the TEE may determine, based on an operation type of a user operation, whether the user operation is an intra-APP input operation.

It should be noted that Manner 1 and Manner 2 may be used separately, or Manner 1 may be used in combination with Manner 2 to improve accuracy. For example, the TEE determines whether the user input is in the non-transparent area; and if the user input is in the non-transparent area, the TEE continuously determines whether the operation type of the user input is a preset operation type, and if the operation type of the user input is a preset operation type, the application in the TEE responds to the user input; or if the user input is not in the non-transparent area or the operation type is not a preset operation type, the TEE sends the user input to the REE for processing.

311: The TEE sends the user input to the REE.

It may be understood that a channel for transmitting the user input may be established between the TEE and the REE. If the TEE in 309 determines that the user input is processed by the REE, the TEE sends the user input to the REE through the channel After receiving the user input, the REE responds to the user input. For example, FIG. 5(c) is used as an example. The TEE detects a user operation, the TEE determines that the user operation is located in the status bar, and an operation type of the user operation is a slide-down operation. The TEE sends the user operation to the REE, and the REE responds to the user operation and displays a slide-down menu.

312: The application in the TEE responds to the user input.

In 302, the application runs in the TEE. If the TEE determines that the user input is responded by the TEE in 309, the application in the TEE responds to the user input. For example, the user input is an intra-APP text information input, and the application compares entered text information with prestored text information. If the entered text information is consistent with the prestored text information, a corresponding processing procedure is performed, for example, electronic device unlocking, application login, transfer, or payment.

It should be noted that in the steps 301 to 308, when the application runs in the TEE, the electronic device displays the TUI, where the TUI is a display interface after the first graph drawn by the TEE and the second graph drawn by the REE are fused. This resolves a problem of a dull TUI in the conventional technology. Specifically, when the application runs in the TEE, the TEE displays the first graph on the layer 1, the REE displays the second graph on the layer 2 to the layer N, and the first graph and the second graph are fused to obtain the final display interface. In this case, if the application in the REE receives the notification message, the notification message may be added to the second graph. In this way, the notification message may be displayed on the display interface obtained after the first graph and the updated second graph are fused. Therefore, when the electronic device displays the TUI, a problem that the TUI cannot display the notification message received by the application in the REE in the conventional technology is resolved, thereby improving display richness of the TUI.

In the steps 309 to 311, after the TEE detects the user input, if the user input is an intra-APP text information input, the application in the TEE responds to the user input; or if the user input is not an intra-APP text information input, the TEE sends the user input to the REE, to be processed by the REE. Therefore, a problem of poor user operation sensitivity in the TUI in the conventional technology is resolved.

Figure 8:
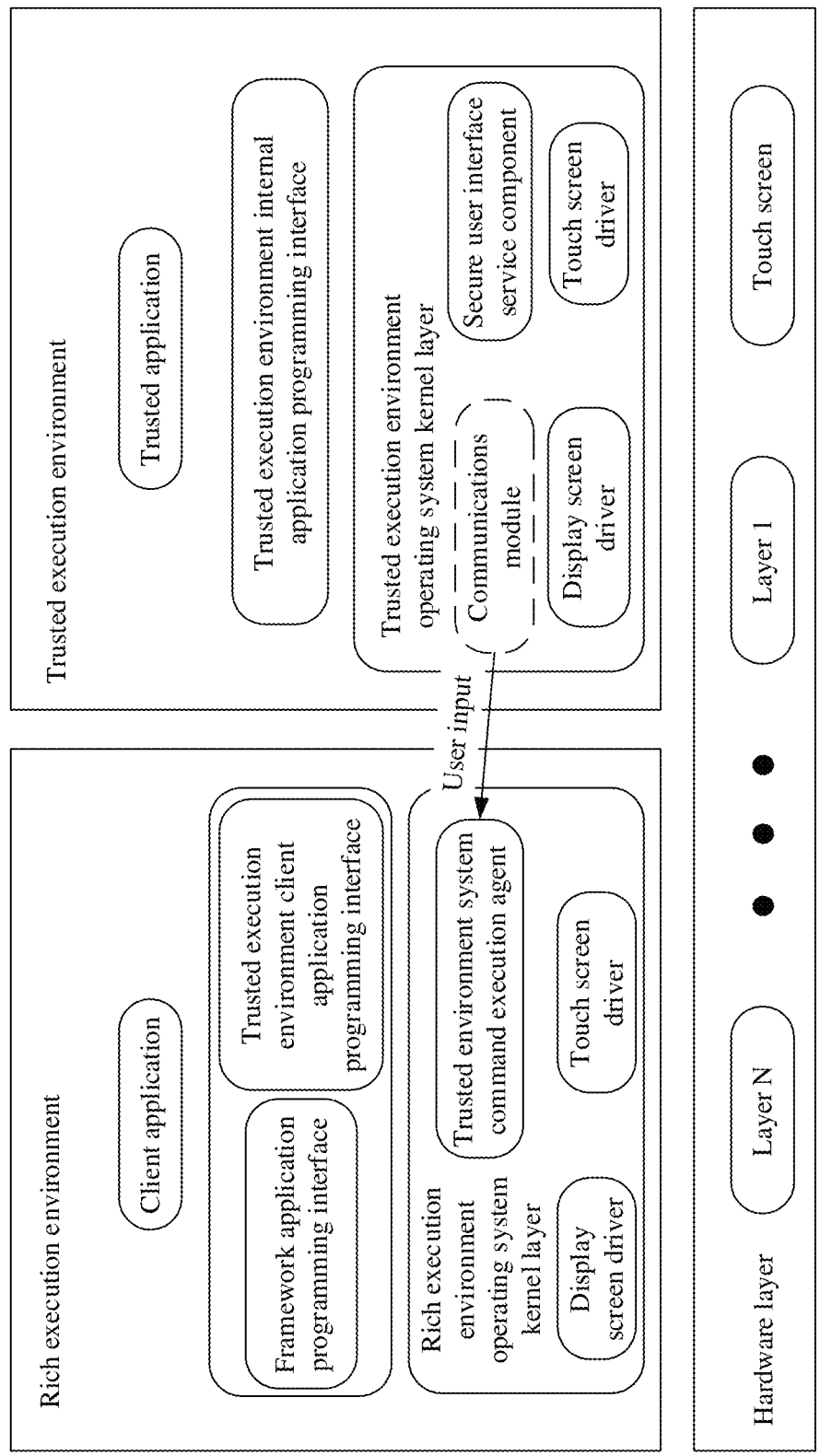
FIG. 8 is a schematic diagram of a TEE+REE architecture according to an embodiment of this application.

The display method provided in the embodiments of this application may be implemented by using a TEE+REE architecture shown in FIG. 8. Different from the existing architecture shown in FIG. 1, in the architecture, a trusted environment system command execution agent (agent for command from REE, Agent_ree) is added to an REE. The Agent_ree may be used as a communications module, and the REE may receive, by using the Agent_ree, a user input sent by a TEE. Correspondingly, a communications module is also added to the TEE, and the communications module is configured to send the user input to the REE. In addition, compared with the existing architecture shown in FIG. 1, corresponding functions are added to some modules in the architecture. For example, the TEE and the REE share a display template. For another example, when a TA runs in the TEE, the TEE displays a first graph on a layer 1 in a display screen, and the REE displays a second graph on a layer 2 to a layer N of the display screen. For another example, a function for determining whether a user operation is responded by the TEE is added to a TUI service in the TEE.

The following describes in detail each module in the TEE+REE architecture shown in FIG. 8.

The REE includes a CA, a framework application programming interface (Framework API), a trusted execution environment client application programming interface (TEE client application programming interface, TEE Client API), and a rich execution environment operating system kernel (REE OS kernel) layer. The rich execution environment operating system kernel layer includes a display screen driver (display screen driver, DSD), a touch screen driver (touch screen driver, TSD), and an Agent_ree.

When the CA runs in the REE, the CA invokes the display screen driver in the REE OS kernel by using the framework API, to control the display screen to display a display interface provided by the CA. When a user performs user input on the touch screen, the touch screen driver sends the user input to the CA by using the framework API, and the CA responds to the user input.

The TEE includes a TA, a trusted application programming development interface (TEE internal application programming interface, TEE Internal API), and a trusted execution environment operating system kernel (TEE OS kernel) layer. The TEE OS kernel layer includes a trusted user interface service (trusted User interface service, TUI Service) component, a display screen driver, a touch screen driver, and a communications module. The communications module may be configured to send the user input to the Agent_ree in the REE. It should be understood that the communications module may be alternatively integrated into another module, and does not need to be independently disposed. For example, a function of the communications module is integrated into the TUI service, that is, the TUI service sends the user input to the REE. Therefore, the communications module in FIG. 8 is represented by a dotted line.

The TA runs in the TEE. The TA invokes the TUI service by using the TEE internal API. The TUI service controls, by using a display module, the layer 1 in the display screen to display the first graph, and the REE controls, by using a display module in the REE OS kernel, the layer 2 to the layer N in the display screen to display the second graph. A TUI is obtained after the first graph and the second graph are fused (or referred to as overlapped). When the user performs an operation on the touch screen, a touch module sends the input operation to the TUI service, and the TUI service determines whether the TEE responds to the input operation. If the TEE responds to the input operation, the input operation is sent to the TA for a response; or if the TEE does not respond to the input operation, the TUI service sends, by using the communications module, the input operation to the Agent_ree in the REE, and the Agent_ree sends the input operation to the CA for a response.

Figure 9A:
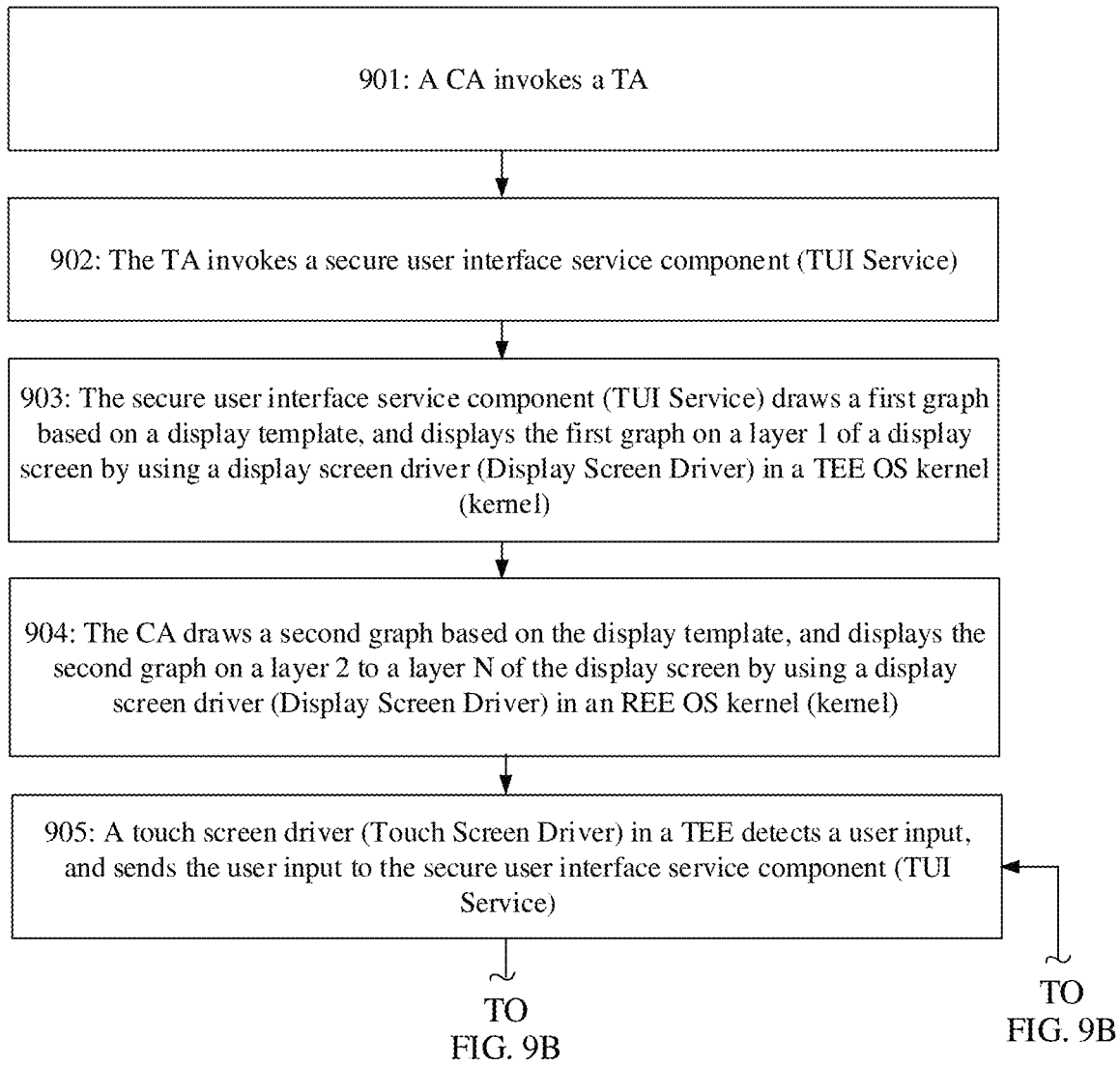
FIG. 9A and FIG. 9B are a schematic flowchart of an image display method according to an embodiment of this application.
Figure 9B:
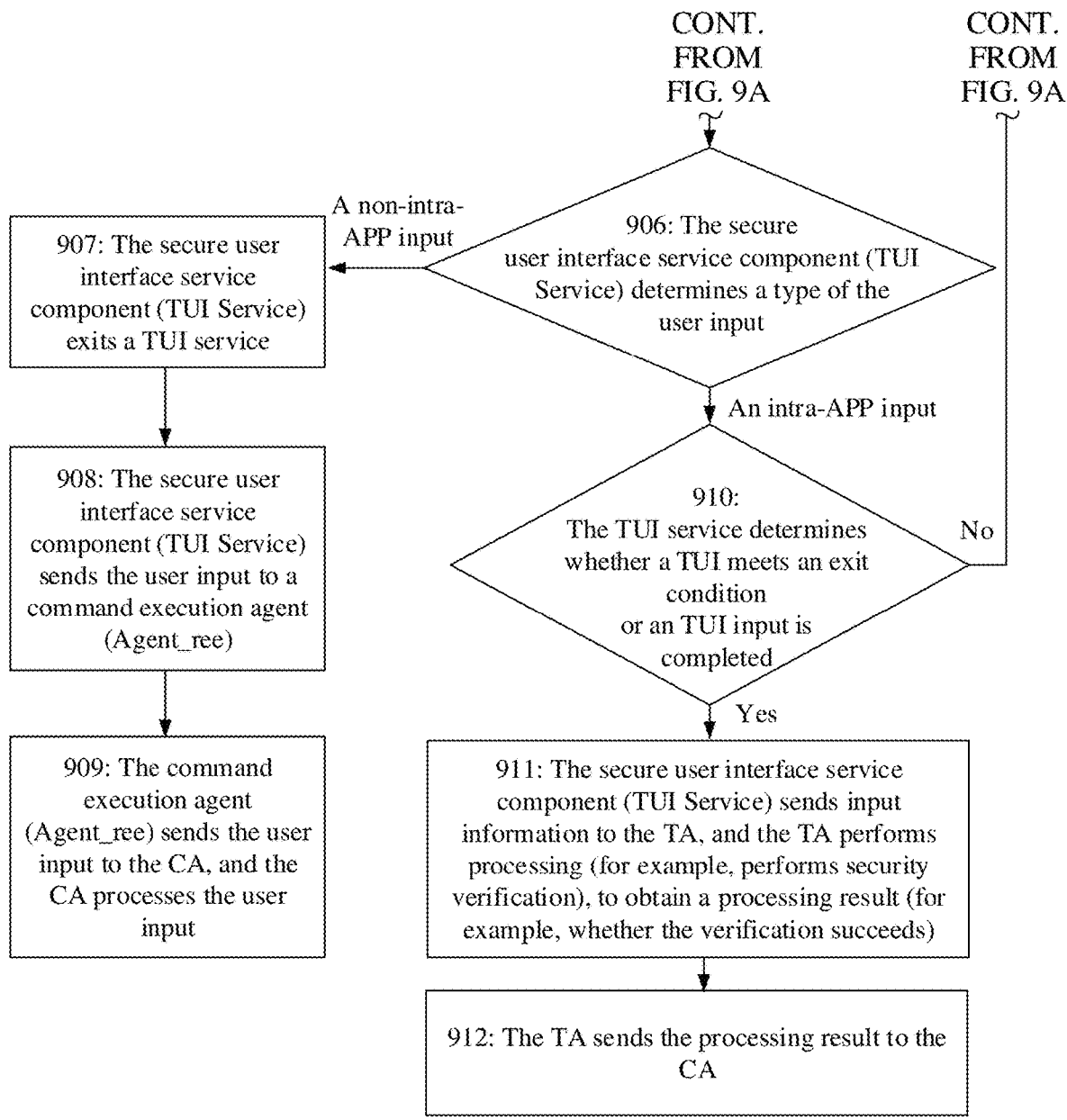

FIG. 9A and FIG. 9B are a flowchart of implementing the display method provided in the embodiments of this application by using the TEE+REE architecture shown in FIG. 8. A procedure may include the following steps.

901: The CA invokes the TA.

Specifically, the CA in the REE invokes the TA of the TEE by using the TEE client API.

902: The TA invokes the TUI service.

903: The TUI service draws a first graph based on a display template, and displays the first graph on a layer 1 of a display screen by using the display screen driver in the TEE OS kernel.

It should be noted that in 903, the TUI service may determine a proper display template based on a current scenario, and then draw the first graph based on the display template. A specific process is not described in detail again.

904: The CA draws a second graph based on the display template, and displays the second graph on a layer 2 to a layer N of the display screen by using the display screen driver in the REE OS kernel.

It may be understood that the display templates used in 903 and 904 are a same display template. It should be noted that a performing sequence between 904 and 901 to 903 is not limited in this embodiment of this application.

905: The touch screen driver in the TEE detects a user input, and sends the user input to the TUI service.

906: The TUI service determines a type of the user input; and if the user input is a non-intra-APP input, 907 to 909 are performed; or if the user input is an intra-APP input, 910 is performed.

907: Exit the TUI service. The exiting the TUI service may include clearing display content of the layer 1, delivering a control right of the layer 1 to the REE, and the like.

908: The TUI service sends the user input to the Agent_ree.

909: The Agent_ree sends the user input to the CA, and the CA processes the user input.

It should be noted that a performing sequence of 907 to 909 is not limited in this embodiment of this application.

910: The TUI service determines whether a TUI meets an exit condition or a TUI input is complete; and if the TUI meets the exit condition or the TUI input is complete, 911 is performed; or if the TUI does not meet the exit condition or the TUI input is not complete, 905 is performed. That the TUI meets the exit condition may include: A user clicks a cancel button in the TUI to trigger TUI exit; an abnormal event triggers TUI exit, where the abnormal event includes an operation, for example, clicking of a power button, an incoming call, or screen capturing; the TA crashes (Crash) to trigger TUI exit; or there is no operation in preset duration of displaying the TUI, for example, 120s, and the TUI is automatically exited. That the TUI input is completed may include that a quantity of pieces of input text information, for example, digital information, reaches a preset quantity, or the user clicks a complete button in the TUI.

911: The TUI service sends input information to the TA, and the TA performs processing (for example, performs security verification) to obtain a processing result (for example, whether verification succeeds).

912: The TA sends the processing result to the CA, and the CA performs subsequent processing.

For example, a lock screen interface is used as an example. If the processing result is that authentication of a password entered by the user succeeds, the CA displays a main interface by using the display screen in response to the processing result.

Figure 10:
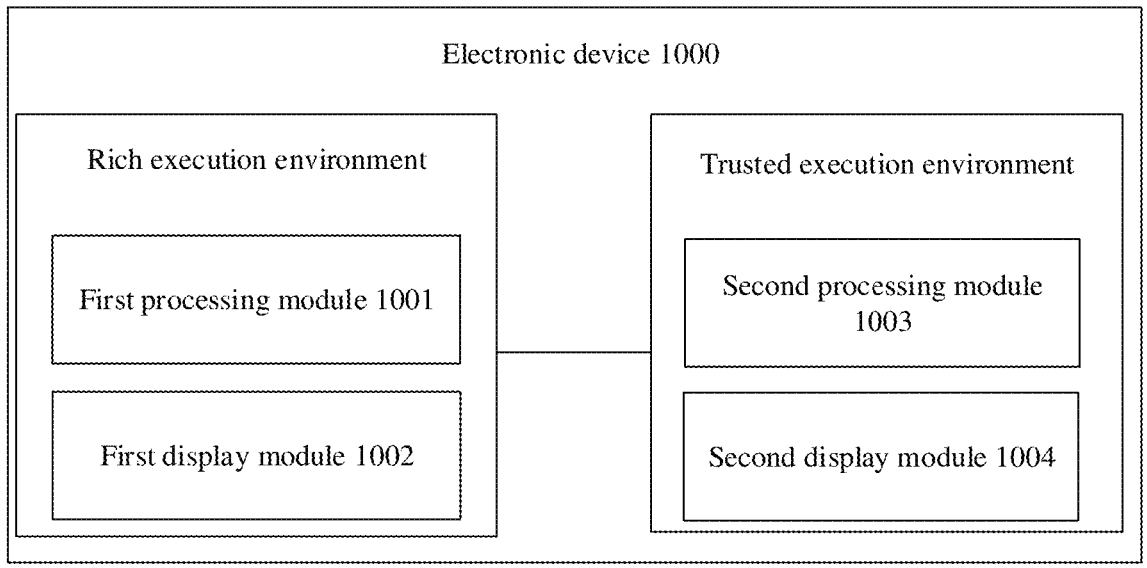
FIG. 10 is a schematic diagram of a logical structure of an electronic device according to an embodiment of this application.

FIG. 10 is a schematic diagram of a logical structure of an electronic device 1000 according to an embodiment of this application. The electronic device 1000 may be a mobile phone, a tablet computer, or the like. As shown in FIG. 10, the electronic device 1000 includes a TEE and an REE, where the TEE includes a first processing module 1001 and a first display module 1002, and the REE includes a second processing module 1003 and a second display module 1004.

The first processing module 1001 is configured to draw a first graph.

The first display module 1002 is configured to display the first graph on a first layer in a display screen of the electronic device.

The second processing module 1003 is configured to draw a second graph.

The second display module 1004 is configured to display the second graph on a second layer in the display screen, and the first layer is located above the second layer.

The first graph includes a transparent area and a non-transparent area, the non-transparent area includes content drawn by the TEE, a display area that is on the second graph and that corresponds to the transparent area includes content drawn by the REE, and when the first layer and the second layer are overlapped for displaying, the transparent area does not shield the content drawn by the REE.

Optionally, a touch screen in the electronic device is located on an upper layer of the display screen, the display screen includes a plurality of layers, the first layer is one or more layers close to the touch screen, and the second layer is one or more layers away from the touch screen.

Optionally, the first layer is a layer closest to the touch screen in the display screen, and the second layer is another layer other than the first layer in the display screen.

Optionally, the first processing module 1001 is further configured to determine, from one or more display templates based on a current scenario, a display template corresponding to the current scenario. The first processing module 1001 is specifically configured to draw the first graph based on the display template, and the second processing module 1003 is specifically configured to draw the second graph based on the display template.

Optionally, the display template is a graph, the graph includes at least one display area, and each display area is configured as the content drawn by the TEE or the content drawn by the REE; or the display template includes at least one graph, each graph corresponds to one layer, and each graph is configured to be drawn by the TEE or drawn by the REE.

Optionally, the content drawn by the TEE includes: information related to a password input.

Optionally, the first processing module 1001 is further configured to: detect a user input, and determine whether the user input needs a response from the TEE; and when the user input does not need a response from the TEE, send the user input to the REE by using a first communications module in the TEE, where the REE performs a corresponding processing procedure in response to the user input.

Optionally, when being configured to determine whether the user input needs a response from the TEE, the first processing module 1001 is specifically configured to: when it is determined that the user input is an input in an application currently run in the TEE, determine that the user input needs a response from the TEE; and when it is determined that the user input is not the input in the application, determine that the user input does not need a response from the TEE.

Optionally, the input in the application includes: an input located in the non-transparent area and/or an input whose operation type meets a preset operation type. An input that is not in the application includes: an input located outside the non-transparent area and/or an input whose operation type is not the preset operation type.

Optionally, the first processing module 1001 is further configured to: when an application in the REE receives a notification message, update the second graph, where the notification message is displayed in a display area that is in an updated second graph and that corresponds to the transparent area in the first graph. The second display module is further configured to display the updated second graph in the second layer.

In an example, a unit/module in any one of the foregoing electronic devices may be one or more integrated circuits configured to implement the foregoing methods, for example, one or more application-specific integrated circuits (ASIC), one or more microprocessors, one or more field programmable gate arrays (FPGA), or a combination of at least two of the integrated circuit forms. For another example, when the unit/module in the electronic device may be implemented by scheduling a program by a processing element, the processing element may be a general-purpose processor, for example, a central processing unit (CPU) or another processor that can invoke the program. For another example, the units may be integrated and implemented in a form of a system-on-a-chip (SOC).

It should be noted that the first processing module 1001 and the second processing module 1003 may be different physical components (herein, the physical components may include a chip, a chip system, a circuit, a circuit system, and the like), or may be a same physical component, for example, all the physical components are a processor. The processor includes a central processing unit (CPU), an application processor (AP), a modem processor, a graphics processing unit (GPU), an image signal processor (ISP), a controller, a memory, a video codec, a digital signal processor (DSP), a baseband processor, and/or a neural-network processing unit (NPU). When the first processing module 1001 and the second processing module 1003 are a same physical component, different computer programs may be used to invoke the physical component to implement different functions.

It should be noted that the first display module 1002 and the second display module 1004 may be a display screen in the electronic device, and the display screen may include a display panel. The display panel may be a liquid crystal display (LCD), an organic light-emitting diode (OLED), an active-matrix organic light-emitting diode (AMOLED), a flex light-emitting diode (FLED), a mini LED, a micro LED, a micro-OLED, quantum dot light emitting diodes (QLED), or the like.

Figure 11:
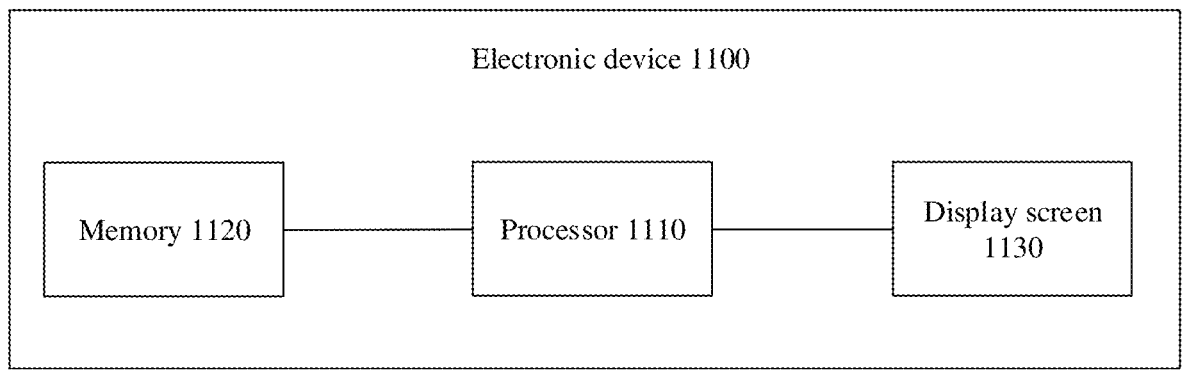
FIG. 11 is a schematic diagram of a structure of an electronic device according to an embodiment of this application.

As shown in FIG. 11, an embodiment of this application provides an electronic device. An REE and a TEE (not shown in the figure) are deployed on an electronic device 1100. The electronic device 1100 further includes: a display screen 1130; one or more processors 1110; and a memory 1120. The one or more processors 1110 may run in the REE or the TEE. When the one or more processors run in the TEE, steps performed by the TEE may be implemented. When the one or more processors run in the REE, steps performed by the REE may be implemented. The one or more processors 1110 may be switched to run in the TEE or the REE in a computer program scheduling manner.

The memory 1120 may store one or more computer programs, the one or more computer programs are configured to be executed by the one or more processors 1110, the one or more computer programs include instructions, and the instructions may be used to perform the steps in the foregoing embodiments.

Based on a same concept as the foregoing method embodiments, an embodiment of this application further provides a computer storage medium. The computer storage medium stores computer-executable instructions. When the computer-executable instructions are invoked by a computer, the computer is enabled to perform a specific process of each embodiment in the foregoing provided method embodiments. In embodiments of this application, the computer-readable storage medium is not limited. For example, the computer-readable storage medium may be a random access memory (RAM), a read-only memory (ROM), or the like.

Based on a same concept as the foregoing method embodiments, an embodiment of this application further provides a computer program product. The computer program product stores instructions. When the instructions are run on a computer, the computer is enabled to perform the method provided in any one of the foregoing possible designs.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

Although some possible embodiments of this application are described, a person skilled in the art can make changes and modifications to the embodiments once the basic inventive concept is learnt. Therefore, the following claims are intended to be construed to cover the embodiments of this application and all changes and modifications falling within the scope of this application.

Clearly, a person skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:

1. An image display method, comprising:
   drawing a first graph in a trusted execution environment (TEE);
   displaying the first graph on a first layer in a display screen;
   drawing a second graph in a rich execution environment (REE); and
   displaying the second graph on a second layer in the display screen, wherein the first layer is located above the second layer,
   wherein the first graph comprises a transparent area and a non-transparent area, the non-transparent area comprises content drawn in the TEE, a display area that is on the second graph and that corresponds to the transparent area comprises content drawn in the REE, and when the first layer and the second layer are overlapped for displaying, the transparent area does not shield the content drawn in the REE.

2. The method according to claim 1, wherein a touch screen in the electronic device is located on an upper layer of the display screen, the display screen comprises a plurality of layers, and the first layer is closer to the touch screen than the second layer.

3. The method according to claim 2, wherein the first layer is closest to the touch screen among the plurality of layers in the display screen.

4. The method according to claim 1, further comprising:
   determining a display template corresponding to a current scenario in the TEE from one or more display templates based on the current scenario in the TEE,
wherein
   the drawing of the first graph in the TEE comprises drawing the first graph based on the display template in the TEE, and
   the drawing of the second graph in the REE comprises drawing the second graph based on the display template in the REE.

5. The method according to claim 4, wherein
   the display template is a graph comprising at least one display area including content drawn in the TEE or content drawn in the REE, or
   the display template comprises at least one graph that corresponds to one layer in the display screen, and the graph is configured to be drawn in the TEE or drawn in the REE.

6. The method according to claim 1, further comprising:
   detecting a user input in the TEE; and
   in response to a determination that the user input does not need a response from the TEE, sending the user input to the REE, wherein the REE performs a corresponding processing procedure in response to the user input.

7. The method according to claim 6, further comprising:
   in response to the user input being input in an application currently run in the TEE, determining that the user input needs the response from the TEE; and in response to the user input not being input in the application, determining that the user input does not need the response from the TEE.

8. The method according to claim 7, wherein
the user input is determined as being input in the application based on at least one of a detection that the user input is located in the non-transparent area or a determination that an operation type of the user input meets a preset operation type, and
the user input is determined as not being in the application based on at least one of a detection that the user input is located outside the non-transparent area or a determination that the operation type of the user input is not the preset operation type.

9. The method according to claim 1, further comprising:
receiving, by an application in the REE, a notification message;
updating the second graph in the REE, wherein the notification message is displayed in a display area that is in an updated second graph and that corresponds to the transparent area in the first graph; and
displaying the updated second graph in the second layer.

10. An electronic device, comprising:
a processor; and
a memory having instructions stored thereon that, when executed by the processor, cause the electronic device to:
draw a first graph in a trusted execution environment (TEE);
cause the first graph to be displayed on a first layer in a display screen;
draw a second graph in a rich execution environment (REE); and
cause the second graph to be displayed on a second layer in the display screen, wherein the first layer is located above the second layer;
wherein
the first graph comprises a transparent area and a non-transparent area, the non-transparent area comprises content drawn in the TEE, a display area that is on the second graph and that corresponds to the transparent area comprises content drawn in the REE, and when the first layer and the second layer are overlapped for displaying, the transparent area does not shield the content drawn in the REE.

11. The electronic device according to claim 10, wherein a touch screen in the electronic device is located on an upper layer of the display screen, the display screen comprises a plurality of layers, and the first layer is closer to the touch screen than the second layer.

12. The electronic device according to claim 11, wherein the first layer is closest to the touch screen among the plurality of layers in the display screen.

13. The electronic device according to claim 10, wherein the electronic device is further caused to:
determine, from one or more display templates based on a current scenario in the TEE, a display template corresponding to the current scenario;
draw the first graph based on the display template; and
draw the second graph based on the display template.

14. The electronic device according to claim 13, wherein the display template is a graph comprising at least one display area including content drawn in the TEE or content drawn in the REE, or the display template comprises at least one graph that corresponds to one layer, and the graph is configured to be drawn in the TEE or drawn in the REE.

15. The electronic device according to claim 10, wherein the the electronic device is further caused to:
detect a user input; and
in response to a determination that the user input does not need a response from the TEE, send the user input to the REE, wherein the REE performs a corresponding processing procedure is performed in response to the user input.

16. The electronic device according to claim 15, wherein the electronic device is further caused to:
in response to the user input being input in an application currently run in the TEE, determine that the user input needs the response from the TEE; and
in response to the user input not being input in the application, determine that the user input does not need the response from the TEE.

17. The electronic device according to claim 16, wherein the user input is determined as being input in the application based on at least one of a detection that the user input is located in the non-transparent area or a determination that an operation type of the user input meets a preset operation type, and
the user input is determined as not being in the application based on at least one of a detection that the user input is located outside the non-transparent area or a determination that the operation type of the user input is not the preset operation type.

18. The electronic device according to claim 10, wherein electronic device is further caused to:
update the second graph in response to an application in the REE receiving a notification message, wherein the notification message is displayed in a display area that is in an updated second graph and that corresponds to the transparent area in the first graph; and
display the updated second graph in the second layer.

19. A non-transitory computer readable storage medium having instructions stored thereon that, when executed by a processor, cause an electronic device to:
draw a first graph in a trusted execution environment (TEE);
cause the first graph to be displayed on a first layer in a display screen,
draw a second graph in a rich execution environment (REE); and
cause the second graph to be displayed on a second layer in the display screen, wherein the first layer is located above the second layer,
wherein
the first graph comprises a transparent area and a non-transparent area, the non-transparent area comprises content drawn in the TEE, a display area that is on the second graph and that corresponds to the transparent area comprises content drawn in the REE, and when the first layer and the second layer are overlapped for displaying, the transparent area does not shield the content drawn in the REE.

20. The electronic device according to claim 19, wherein a touch screen in the electronic device is located on an upper layer of the display screen, the display screen comprises a plurality of layers, and the first layer is closer to the touch screen than the second layer.

* * * * *